(12) United States Patent
Seel et al.

(10) Patent No.: US 11,052,827 B2
(45) Date of Patent: Jul. 6, 2021

(54) CAR CARGO SPACE COVER

(71) Applicant: Macauto Industrial Co., Ltd., Tainan (TW)

(72) Inventors: Holger Seel, Wuppertal (DE); Sven-Oliver Seel, Wuppertal (DE)

(73) Assignee: Macauto Industrial Co., Ltd, Tainan (TW)

( * ) Notice: Subject to any disclaimer, the term of this patent is extended or adjusted under 35 U.S.C. 154(b) by 73 days.

(21) Appl. No.: 16/558,138

(22) Filed: Sep. 1, 2019

(65) Prior Publication Data

US 2020/0114827 A1 Apr. 16, 2020

(30) Foreign Application Priority Data

Oct. 12, 2018 (DE) .......................... 102018125299.4

(51) Int. Cl.
  *B60R 5/04* (2006.01)
(52) U.S. Cl.
  CPC .................... *B60R 5/047* (2013.01)
(58) Field of Classification Search
  CPC ........................................................ B60R 5/047
  USPC ...................................................... 296/37.16
  See application file for complete search history.

(56) References Cited

U.S. PATENT DOCUMENTS

| 5,727,836 A | 3/1998 | Hosoya | |
| 5,961,172 A * | 10/1999 | Ament | B60R 5/047 160/238 |
| 2017/0210212 A1* | 7/2017 | Miyamae | B60J 7/198 |

FOREIGN PATENT DOCUMENTS

| CN | 2014 72247 U | 5/2010 |
| DE | 19532276 A1 | 4/1997 |
| DE | 4013158 C1 | 8/2013 |
| DE | 102012002031 A1 | 8/2013 |
| WO | WO2014-026658 A | 2/2014 |

* cited by examiner

*Primary Examiner* — Joseph D. Pape
(74) *Attorney, Agent, or Firm* — Von Rohrscheidt Patents

(57) ABSTRACT

A cargo space cover for a motor vehicle, the cargo space cover including a winding shaft housing with a winding shaft arranged rotatably therein and configured to receive a cover web movable between a functional position where the cover web is at least partially pulled off from the winding shaft and a storage position where the cover web is substantially wound onto the winding shaft; a first support and a second support arranged opposite to one another and at least indirectly attached to the motor vehicle body; a first end cap arranged at a first face of the winding shaft housing; a second end cap arranged at a second face of the winding shaft housing, wherein the first support includes a first receiving space for receiving the first end cap, wherein the first receiving space includes a receiving opening that is oriented towards the second support.

18 Claims, 30 Drawing Sheets

CAR CARGO SPACE COVER

RELATED APPLICATIONS

This application claims priority from and incorporates by reference German Patent Application DE 10 2018 125 299.4 filed on Oct. 12, 2018.

FIELD OF THE INVENTION

The invention relates to a cargo space cover for a motor vehicle.

BACKGROUND OF THE INVENTION

A generic cargo space cover is described e.g. in WO 2014 026 658 A1. The cover web included therein includes a first support and a first face side end cap and an opposite second end cap that is offset by the winding shaft housing and that includes a second support. The first support includes an axially oriented interlocking pin that engages a complementary recess of the first support. Similar to the invention the engagement can only be disengaged by moving the winding shaft housing in a direction towards the second support. The second end cap however is provided with a pivot bar which interlocks in a locking bar recess of the second support. The interlocking of the second support and the second end cap can thus be disengaged by an unlocking moment of the pivot bar similar to the function of the invention.

Therefore WO 2014/026 658 A1 has to move the first end cap essentially in axial direction of the winding shaft housing into the first support in order to mount the cargo space cover and thereafter the second end cap is inserted into the second support by a movement that is directed downward in a typical installation position in the vehicle until the spring loaded pivot bar engages the locking bar cut out on the support side. Differently therefrom there are various cargo space covers where both supports have upward open receiving cavities so that the winding shaft housing is mounted into both supports by an essentially top down insertion movement. An embodiment using this function is DE 195 32 276 A1 where both end caps are provided with a pivot bar. The pivot bars engage support side locking bar cut outs. Differently from the advantageous embodiment of the invention both end caps are used for unlockable engagement.

DE 10 2012 002 031 A1 is configured similar. The embodiment is characterized in that one of the end caps forms an engagement protrusion and is supported with respect to the winding shaft housing axially move able under a spring preload. The other end cap includes a sliding locking bar. The locking protrusion and the sliding locking bar engage corresponding bar cut outs of the supports. The printed documents DE 10 2012 002 031 A1 and DE 195 32 276 A1 that disclose locking devices on both sides provide transversal centering of the cargo space cover between the 2 supports using the spring loaded locking bars that are provided at both ends so that dimensional tolerances can be compensated.

WO 2014/026 658 A1 deals differently with dimensional tolerances. Instead of using transversal centering the anchoring protrusion is fabricated with a sufficient axial length. Vertical and horizontal interlocking elements assure a unilaterally defined position at the second end cap and the second support. Thus dimensional tolerances are felt by a corresponding gap dimension between the first support and the first end cap.

DE 195 32 276 A1 discloses ejectors at both face portions of the winding shaft housing. These are ejector pins that are oriented radially relative to the winding shaft housing and spring loaded. In unlocked condition these ejector pins lift the cargo space cover by a certain dimension upward from the supports. The advantage of these ejectors is easier removal of the cargo space cover. Furthermore the ejectors clearly show when the cargo space cover is not correctly inserted into the supports. Last not least the spring loaded ejector pins bridge dimensional tolerances that are provided in the vertical direction, this means in the retrieval direction and cause an engagement of the pivot bars in the bar cut outs without clearance. Rattling noises are thus effectively minimized even when the motor vehicle runs over uneven ground.

WO 2014 02 66 58 A1 has the essential advantage that the unilateral locking only requires a small number of components so that fabrication complexity is substantially reduced. Thus operations are substantially simplified for the user when the interlocking is only provided on one side.

When the vehicle width and thus the length of the winding shaft housing increases mounting and dismounting of these cargo space cover is rendered more difficult since also the cargo space depth and thus the operational travel that is required for reaching the first and the second support is greater.

BRIEF SUMMARY OF THE INVENTION

Thus, it is an object of the invention to improve mounting and dismounting of a cargo space cover.

The object is achieved by a cargo space cover for a motor vehicle, the cargo space cover including a winding shaft housing with a winding shaft arranged rotatably therein and configured to receive a cover web movable between a functional position where the cover web is at least partially pulled off from the winding shaft and a storage position where the cover web is substantially wound onto the winding shaft; a first support and a second support arranged opposite to one another and at least indirectly attached to the motor vehicle body; a first end cap arranged at a first face of the winding shaft housing; a second end cap arranged at a second face of the winding shaft housing, wherein the first support includes a first receiving space for receiving the first end cap, wherein the first receiving space includes a receiving opening that is oriented towards the second support, wherein the first support includes a first support interlocking element and the first end cap includes first end cap interlocking element that cooperate with each other and that are configured to provide a disengageable interlocking of the winding shaft housing, wherein the second support includes an upward open receiving space for receiving the second end cap, wherein the second support includes a second support interlocking element and the second end cap includes a second endcap interlocking element that cooperate with each other and that facilitate an upward retrieval movement after unlocking; wherein the first support includes a first support guide structure and the first end cap include a first end cap guide structure that cooperate with each other and that engage before the first end cap penetrates the first receiving space of the first support.

These particularly advantageous support structures facilitate establishing an auxiliary positioning before actually interlocking the first end cap in the first support in particular in wide vehicles with corresponding deep cargo space covers. Pairing the respective support contours facilitates applying the first end cap to the first support so that the second end cap is movable into a mounting position at the second support. While or after the second end cap is positioned for mounting the interlocking devices of the first support and the first end cap engage each other. In order to complete the assembly an interlocking fixing is performed between the second end cap and the second support. It is possible this way to feed the winding shaft housing with the first end cap forward into the first support and to provide a position correct pairing of the second end cap and the second support when the support structures cooperate. A simultaneous alignment of both end caps with their respective supports is therefore not required.

In a first embodiment it is provided that the support structure of the first support is made from at least one support plateau that is arranged in front of the receiving opening in a direction towards the second support wherein two support plateaus are advantageously provided which are arranged in front and behind of the receiving opening with respect to the longitudinal axis of the vehicle, wherein it is provided in particular that the support structure of the first end cap is configured as a radially protruding shoulder at least with respect to the winding shaft housing configured to contact the support plateau, wherein at least two shoulders are provided that are arranged diametrically opposed and radially protruding with respect to the winding shaft housing.

In this embodiment of support structures the shoulders of the first end cap are applied to the support plateaus arranged in front of the actual receiving opening. Thereafter the second end cap and the second support are paired. Thus, the interlocking elements of the first support and the first end cap are paired with each other during the alignment process of the second end cap and the second support so that the anchoring is performed in the portion of the first support while the second end cap is being aligned with the second support.

Thus, it can be provided that the receiving space includes at least one recess to receive the at least one shoulder of the first end cap, advantageously however two recesses to receive a respective shoulder of the end cap, in particular when the at least one shoulder of the first end cap form the interlocking elements together with the at least one recess of the first support to provide the interlocking of the winding shaft housing that is advantageously not unlockable and only disengageable by a retrieval movement in a direction towards the second support.

It an essential advantage that the support structure on a side of the first end cap simultaneously forms an interlocking element of the first end cap.

An alternative embodiment of the support structure is characterized in that the support structure of the first support is an axially oriented support cavity with respect to the inserted winding shaft housing, in particular when the support structure of the first end cap is a support pin that protrudes axially with respect to the winding shaft housing.

In this embodiment of the support structures it is provided that the first support forms protruding interlocking lugs with respect to the inserted winding shaft housing that protrude radially into the receiving space for the first end cap, in particular when the first end cap of the winding shaft housing forms interlocking grooves that are oriented radially inward and that cooperate with the interlocking lugs of the first support.

To sum it all up the essential advantage of the support structures that are illustrated in two variants is that the positioning of the first end cap and the first support and of the second end cap and the second support as well as the subsequent interlocking can be performed independently from each other.

In a particularly advantageous embodiment the winding shaft housing and the support have cooperating centering devices that fix the winding shaft housing in a position that is centered between the supports. Thus, the centering devices of the winding shaft housing are advantageously arranged at the first end cap and the second end cap.

Centering the winding shaft housing between the supports, thus centering in the transversal direction of the vehicle has esthetical advantages. Dimensional tolerances at the body stops for the supports or of the winding shaft housing length are not visually evident due to identical gap dimensions between the first support and the first end cap and between the second support and the second cap. Functionally the centering has the essential advantage that precise locking and unlocking is assured between the locking devices of the second end cap and the second support. Due to the centering and contrary to a unilaterally defined position there is a sufficient movement space for the pivotable locking bar of the second end cap in an unlocking direction even when there are dimensional tolerances. In so far the centering represents an essential prerequisite for a simple and comfortable handling of the locking device.

In a particularly advantageous embodiment it is provided that at least the centering device of the second support forms an ejector together with the associated centering device of the winding shaft housing wherein the ejector lifts the second end cap of the winding shaft housing in upward direction when the interlocking is disengaged.

The ejector according to the invention lifts the end of the winding shaft housing that is provided with the second end cap at least partially out of the second support and thus provides a visual indication that a correct interlocking and thus a fixing of the cargo space cover in the vehicle is lacking. The ejector furthermore facilitates dismounting the cargo space cover in that it prevents a cooperation of the locking devices through a corresponding relative movement by lifting the face end of the winding shaft housing that is provided with the locking device after the unlocking process. Thus, an operator who wants to dismount the cargo space cover can separate the unlocking process from the retrieval process. However, it is an essential advantage of the embodiment according to the invention to combine the centering device and the ejector in the subassembly and thus reduce the number of components. This reduces fabrication complexity of the cargo space cover according to the invention.

In particular it is provided that the first centering device is configured as a centering plunger that is spring loaded in a longitudinal axial direction relative to the winding shaft and second centering devices are configured as rigid centering contours wherein the centering plungers are advantageously arranged at the winding shaft housing and the centering contours are configured at the support side, in particular when the first support forms a first centering contour and the associated first centering plunger at the winding shaft housing side forms a downward oriented first slanted centering surface that slopes downward in a direction towards the second support wherein the first slanted centering surface imparts an upward oriented force component upon the winding shaft housing together with the first centering contour, wherein it is provided that the second support forms a second centering contour which forms an upward oriented sliding surface that is sloped in a direction towards the first support and wherein the cooperating winding shaft side second centering plunger forms a second slanted centering surface that is oriented approximately parallel and that cooperates with the sliding surface.

It is evident from this configuration of the centering contours that the spring forces that act axially with respect to the winding shaft housing due to the centering function and due to the provided sloped centering surface can also become effective in the radial direction in particular vertically upward. This way the centering contours of the first support and the second support simultaneously serve as ejectors, wherein the ejector provides a rattle free support of a winding shaft housing in the first support in the portion of the non-unlockable interlocking caused by the first support and the first end cap due to the vertically acting forces of the ejector. The advantageously non-unlockable interlocking renders an ejection in the vertically upward direction impossible. On the side of the second end cap and the second support the ejector has the function in interlocked condition to assure a rattle free support of the winding shaft housing in the second support in addition to the ejector function.

However, when the second end cap is unlocked it is retrieved from the second support and the centering devices at the first end cap and at the first support provide an ejection movement in the axial direction.

It is furthermore provided that the second end cap includes a locking element configured as a pivot bar that protrudes in a direction of the second support and that is movable between a locking position and an unlocking position and that includes preceding support surfaces with respect to the pivoting locking bar in the unlocked position.

When inserting the winding shaft housing into the second support the pivoting locking bar is moved by a housing wall of the second support against a spring force into its unlocking position before the pivoting locking bar that is aligned with a locking bar cut out that is provided in the second support is moved by the spring force into the locking position and thus interlocked in the second support.

The insertion process of the second end cap into the second support requires force which is essentially determined by the friction pairing between the locking element and the housing of the second support besides optionally provided ejectors. Since high spring forces are applied to the locking bar element in order to provide reliable interlocking the friction force increases with an increasing movement of the pivotable locking bar into the locking position. When additional centering devices are provided according to the invention also spring forces have to be considered that act axially from the centering device in the portion of the first end cap and which increase the friction forces. The support surfaces that are in front in the movement direction according to the invention facilitate minimizing the friction forces.

It is furthermore provided that the second end cap forms a locking bar housing that protrudes in a radially upward direction relative to the winding shaft housing, wherein the locking bar housing receives a pivotable locking bar arranged at the winding shaft housing.

The essential advantage of a protruding locking bar housing that is visible quite well can be found in the fact that the face of the winding shaft housing that is used for unlocking and locking is also visible quite well when the cargo space cover is mounted. It is furthermore provided that the locking bar housing includes a cambered cover surface that is in particular essentially cambered according to the pivot radius of the pivot bar.

This housing shape does not only save material due to its adaptation to its pivot path of pivoting locking bar but indicates the pivot movement that is required for the unlocking in a manner that is visually intuitive for the user.

It is furthermore provided that the locking bar housing, in particular the cover surface of the locking bar housing has a housing cut out that corresponds at least to the maximum pivot travel of the pivoting locking bar in the opening direction, in particular when the side walls of the locking bar housing slope downward from the cover surface to the face wall of the end cap proximal to the second support down approximately to the surface level of the winding shaft housing so that a housing cut out is provided that corresponds to the pivot travel of the pivoting locking bar.

Though this particular housing configuration the pivoting locking bar visible to the user. The cover surface of the locking bar itself has a curvature that is adapted to the locking bar housing so that a surface pairing is provided between the cover wall of the locking bar housing and the cover wall of the pivotable locking bar when the pivotable locking bar is moved into an unlocking condition. This facilitates implementing a stable pivot movement. Furthermore the pivotable locking bar forms an esthetically appealing component together with the locking bar housing.

To sum it all up the shape of the locking bar housing, in particular in combination with an accordingly configured pivoting locking bar provides a locking device for the cargo space cover according to the invention that is useable in a surprisingly intuitive manner.

BRIEF DESCRIPTION OF THE DRAWINGS

Further advantages of the invention can be derived from the subsequent description of an embodiments with reference to drawing figures, wherein.

DETAILED DESCRIPTION OF THE INVENTION

Figure 1:
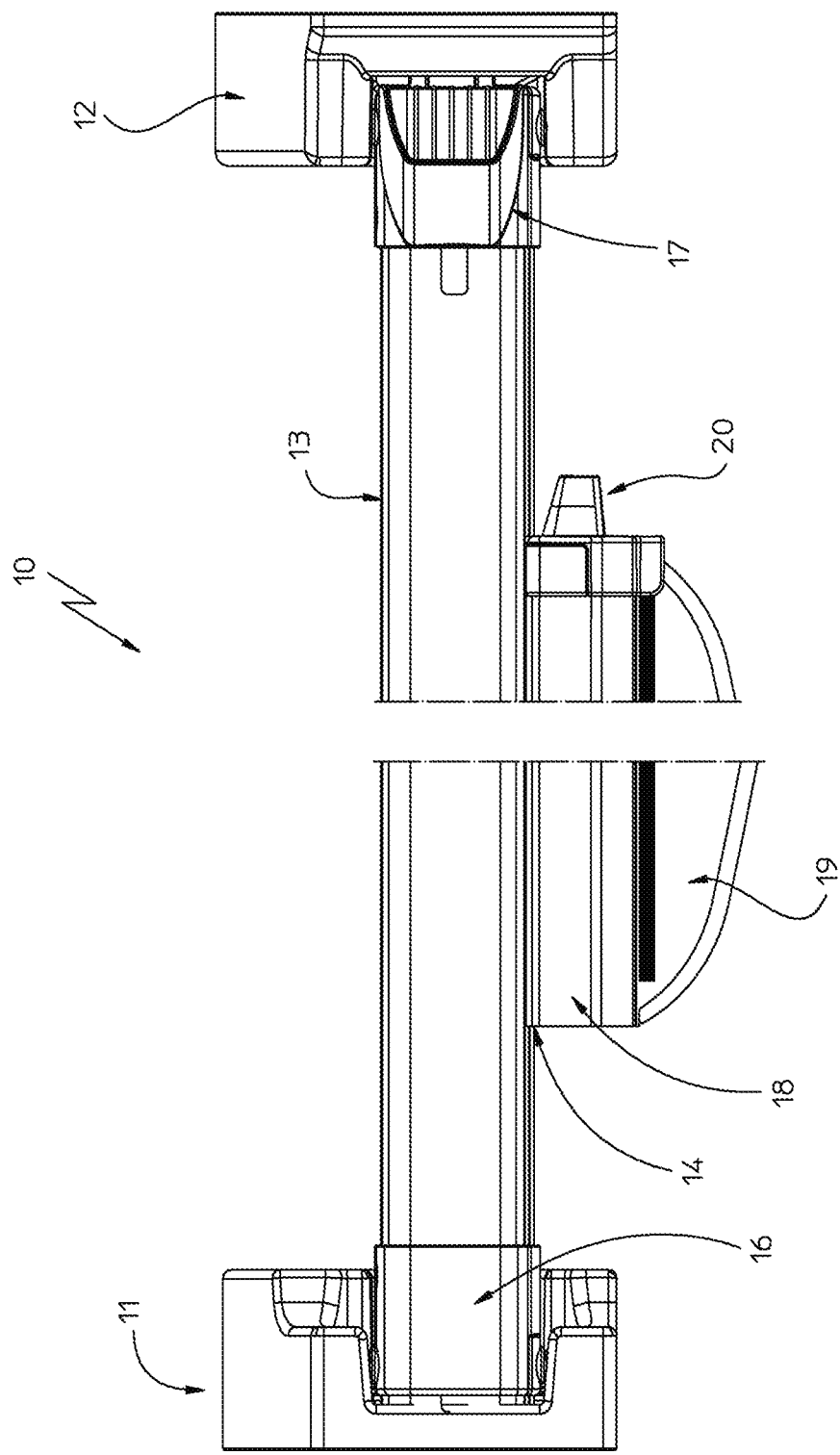
FIG. 1 illustrates a top view of the cargo space cover according to the invention.

A cargo space cover according to the invention is designated with the reference numeral 10 in the drawing figures.

The cargo space cover 10 and its components are now described with reference to FIGS. 1-28. The description is based on a typical installation position in the vehicle. This position is typically behind the rear seat bench where a cargo space adjoins. Thus, the support 11, 12 that is fixed at the vehicle body is attached at two opposite side walls of the vehicle.

The winding shaft housing 13 extends in the transversal direction of the vehicle between the supports 11, 12. The cover web 14 is movable along the longitudinal axis of the vehicle towards the rear of the vehicle thus backward into a functional position. Upper components of the cargo space cover 10 are oriented away from the base group of the vehicle, lower components of the cargo space cover 10 are oriented towards the floor group of the vehicle.

The embodiments described herein only relate to a cargo space cover according to WO 2014/026 658 A1 that is unlockable on one side. In this cargo space cover a connection between a locking device and the associated support is disengaged and a retrieval of the end of the cargo space cover is performed in upward direction. This way the non-unlockable fixation is disengaged by removing the cargo space cover from the support that is oriented away from the locking device by performing a retrieval movement that is oriented essentially along the longitudinal axis of the winding shaft. The support structures of components that engage each other on a side of the non-unlockable fixation that are described infra can be used with respect to their function, also for cargo space covers that are lockable on both sides.

Figure 2:
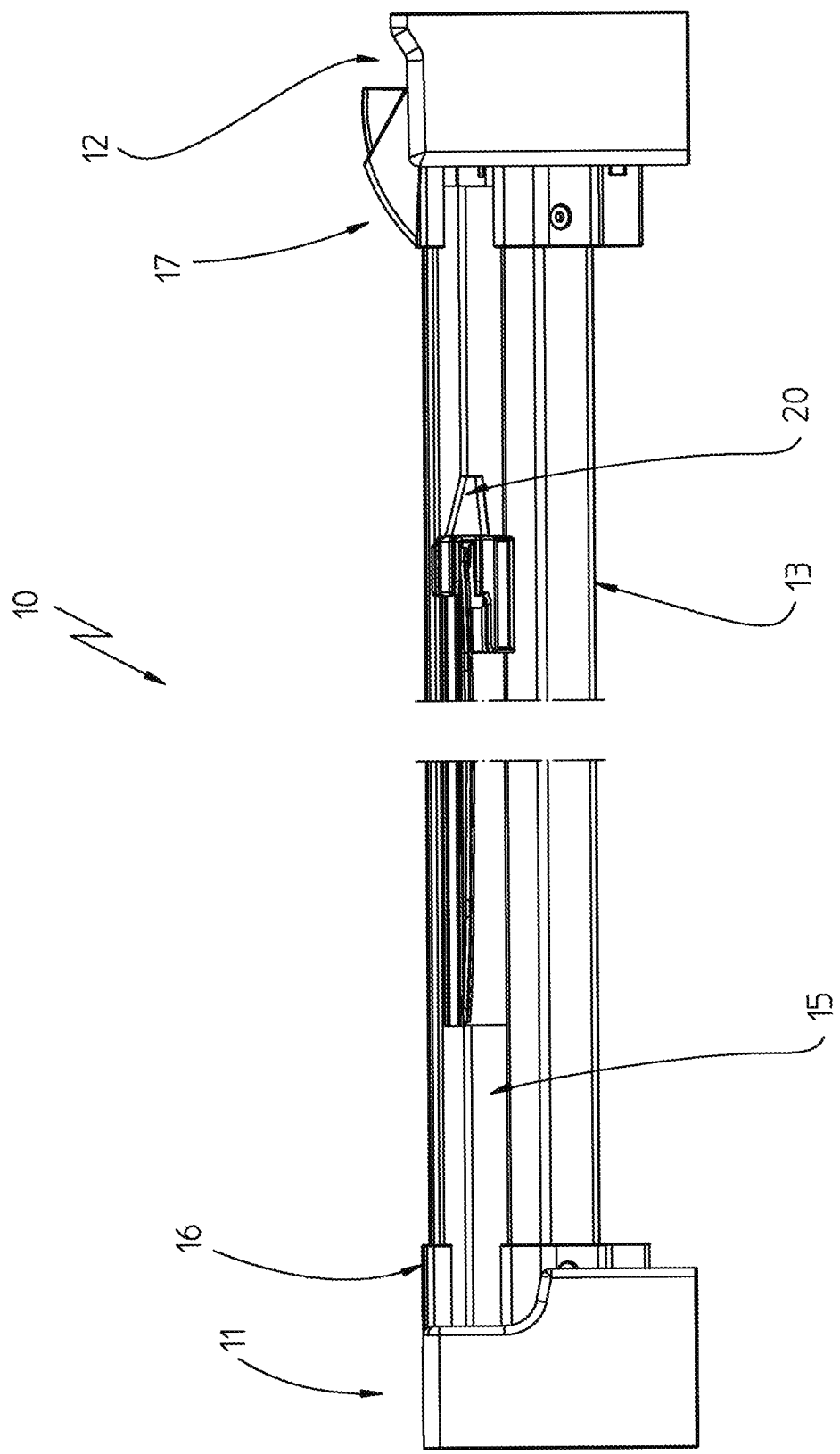
FIG. 2 illustrates a view of a pull out slot of a winding shaft housing of the cargo space cover according to FIG. 1.

FIG. 1 illustrates the cargo space cover 10 in a top view. FIG. 2 illustrates the cargo space cover 10 in a view onto the exit slot 15 of the winding shaft housing 13 through which the cover web 14 is pulled off from a winding shaft that is supported in the winding shaft housing 13.

The cargo space cover 10 illustrated in FIG. 1 includes a winding shaft housing 13 with a first end cap 16 and the second end cap 17 that are arranged at end faces of the winding shaft housing 13, With respect to the illustration plane of FIGS. 1 and 2 the first end cap 16 is arranged on the left side. The second end cap 17 is arranged on the right side. A first support 11 (left side) and a second support 12 (right side) are parts of the cargo space cover 10. The first end cap 16 is fixed in the first support 11. The second end cap 17 is fixed in the second support 12.

Within the winding shaft housing 13 there is a winding shaft that is not illustrated in the drawing figures. The winding shaft is coupled with a motor drive, in particular a motor with a wind up spring. On the winding shaft a cover web 14 is rolled up in a storage position and can be pulled off from the winding shaft through an exit slot 15 of the winding shaft housing 13 into a functional position away from the winding shaft housing 13 while building up a reset force of the wind up spring motor. The cover web 14 includes a tension rod 18 at a free end wherein the tension rod is provided with a contour blind 19. The tension rod 18 forms hook element 20 at one end that are illustrated in FIGS. 1 and 2 only on the right side and which are used to support the cover web 14 in a functional position against a reset force of the wind up spring motor.

Figure 3:
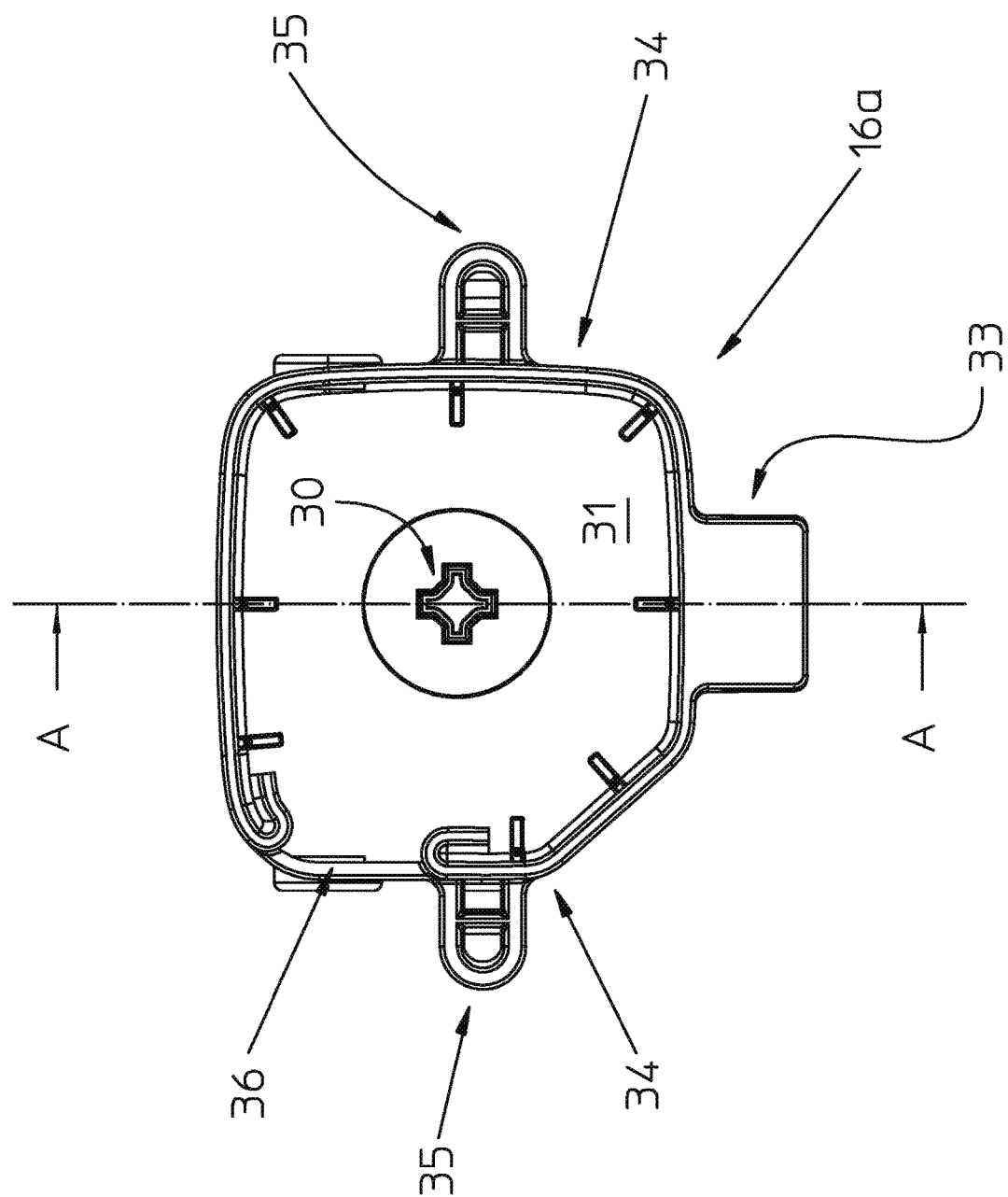
FIG. 3 illustrates a view of an inside of a first end cap in a first embodiment.
Figure 4:
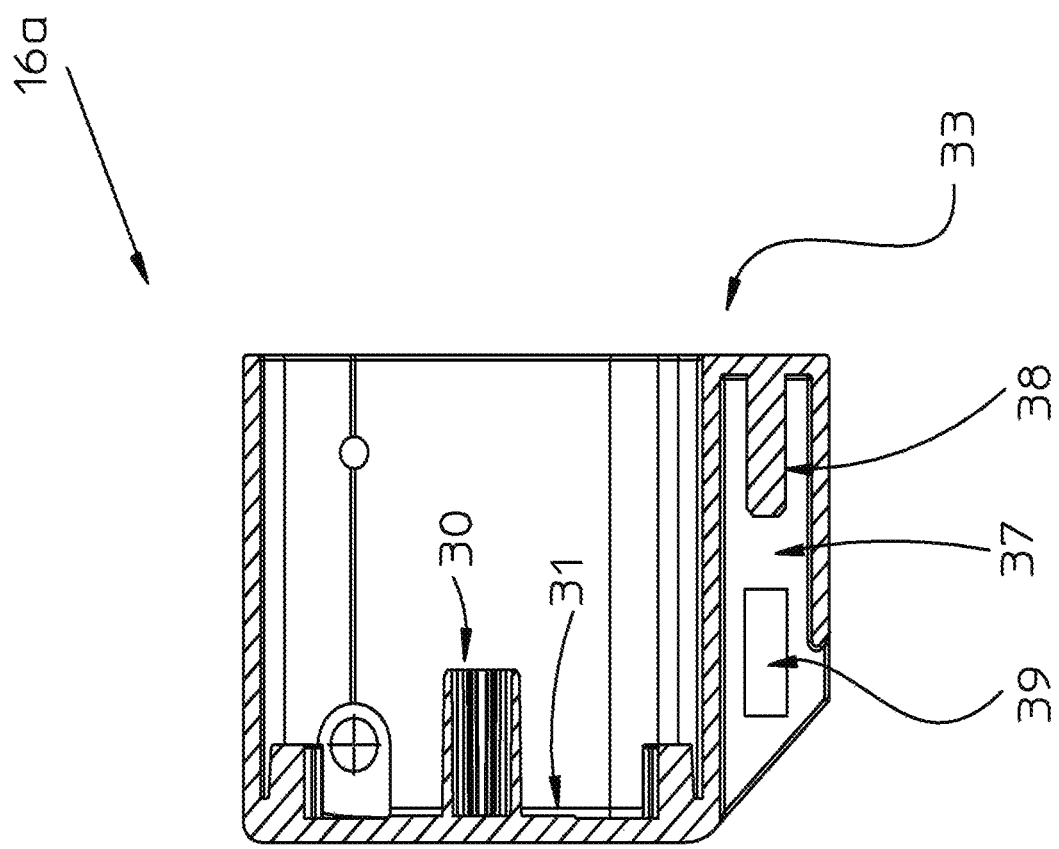
FIG. 4 illustrates a sectional view of the first end cap according to the sectional line A-A in FIG. 3.
Figure 5:
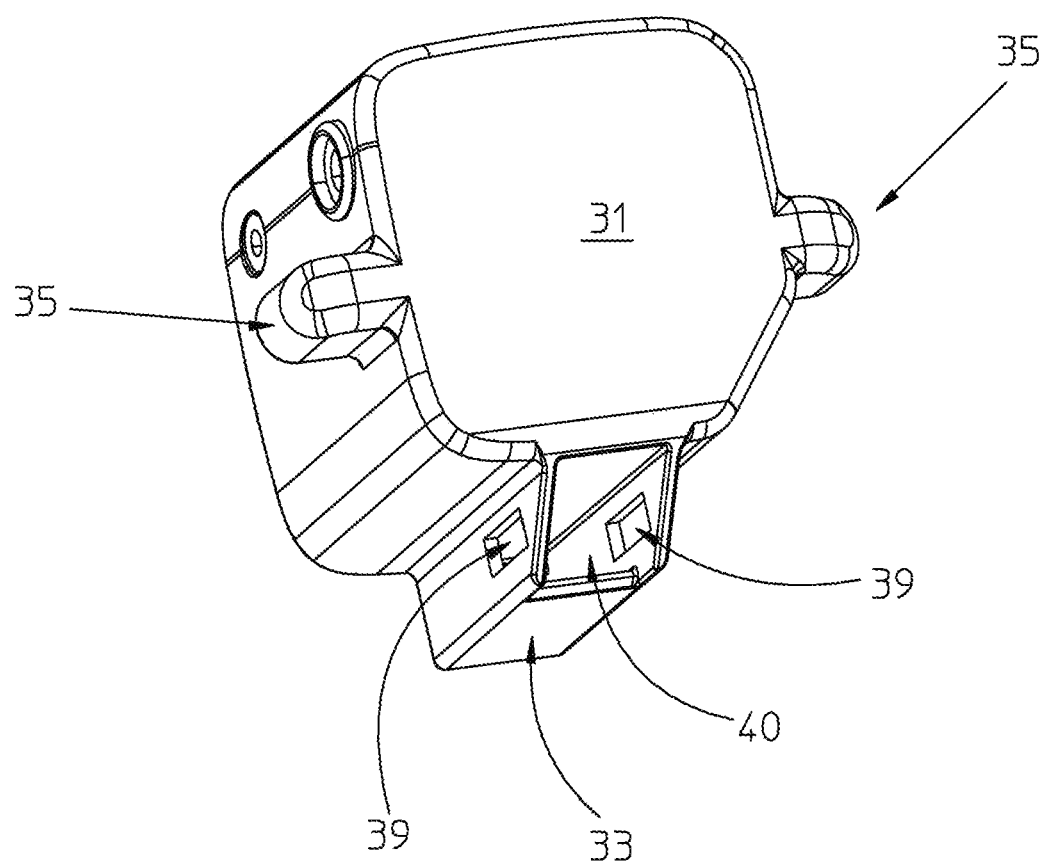
FIG. 5 illustrates a perspective view of the face of the first end cap according to FIG. 3.

The first end cap 16 is illustrated in a first embodiment as a first end cap 16a in FIGS. 3-5 all by itself, FIG. 3 illustrates the first end cap 16a looking at its inside. The first end cap 16a is provided with an axial protrusion 30 on an inside at a face wall 31 oriented towards the first support in order to provide a rotation bearing for the winding shaft that is not illustrated. The base wall 32 of the first end cap 16a forms a housing shaped centering device support 33 whereas the side walls 34 that are oriented along the vehicle longitudinal axis are provided with fixing elements that are configured as shoulders 35 that protrude in a radial direction. In the embodiment according to FIGS. 3-5 the shoulders 35 are oriented parallel to the longitudinal axis of the vehicle. The side wall 34 that is oriented towards the rear of the vehicle is provided with a clear cut 36 that is aligned with the exit slot 15 of the winding shaft housing 13 and which facilitates a pass through of the cover web.

FIG. 4 illustrates the first end cap 16a in a sectional view according to the sectional line A-A in FIG. 3. The centering device support 33 is open in a direction towards the first support 11 and includes a support cavity 37 configured to receive a centering device that will be described infra. A support pin 38 protrudes into the support space 37.

The perspective view of the first end cap 16a lets a viewer look at the outside of the face wall 31 and clearly shows the shoulders 35 that are oriented along the longitudinal axis of the vehicle and that exit radially from the first end cap 16a. The opening 40 of the support cavity 37 is also visible and oriented towards the first support wherein the interlocking window 39 is also clearly visible in the illustration. A centering device can be pushed out through this opening 40 of the support cavity 37 wherein the centering device is supported in the interlocking window 39 so that the centering device is movable in a longitudinal direction of the winding shaft housing.

Figure 6:
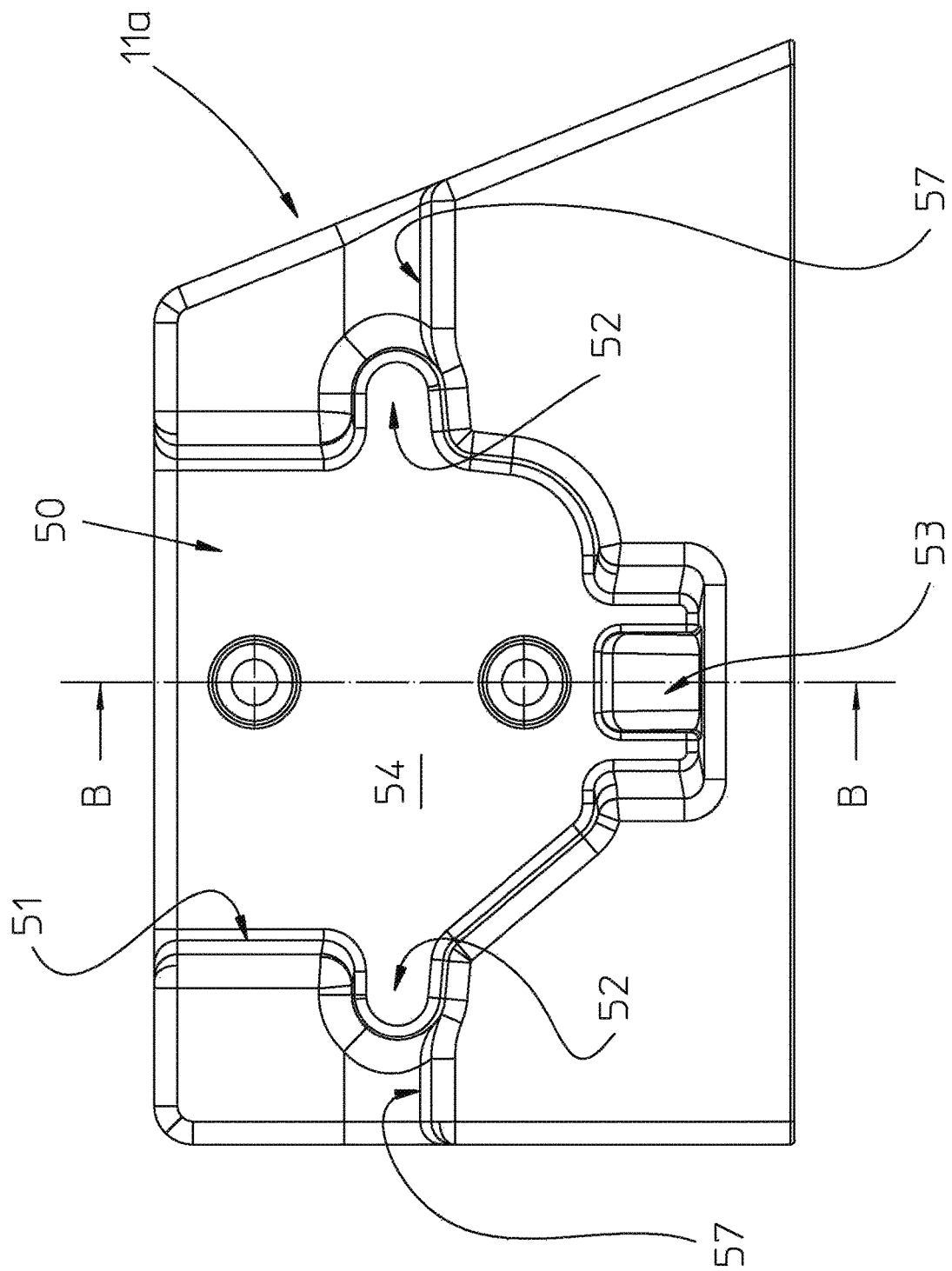
FIG. 6 illustrates a view of a first support in a first embodiment in a direction towards the receiving space.
Figure 7:
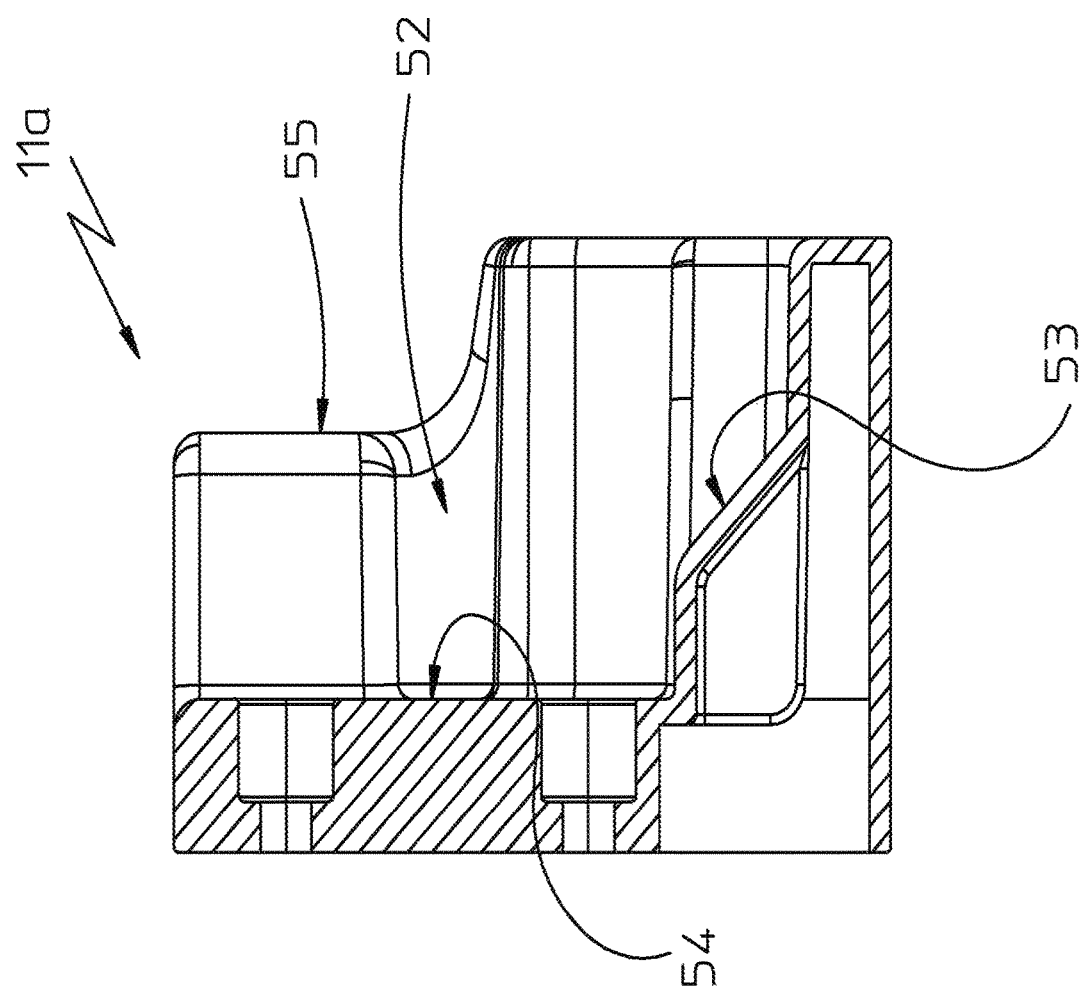
FIG. 7 illustrates a sectional view of the first support according to the sectional line B-B in FIG. 6.
Figure 8:
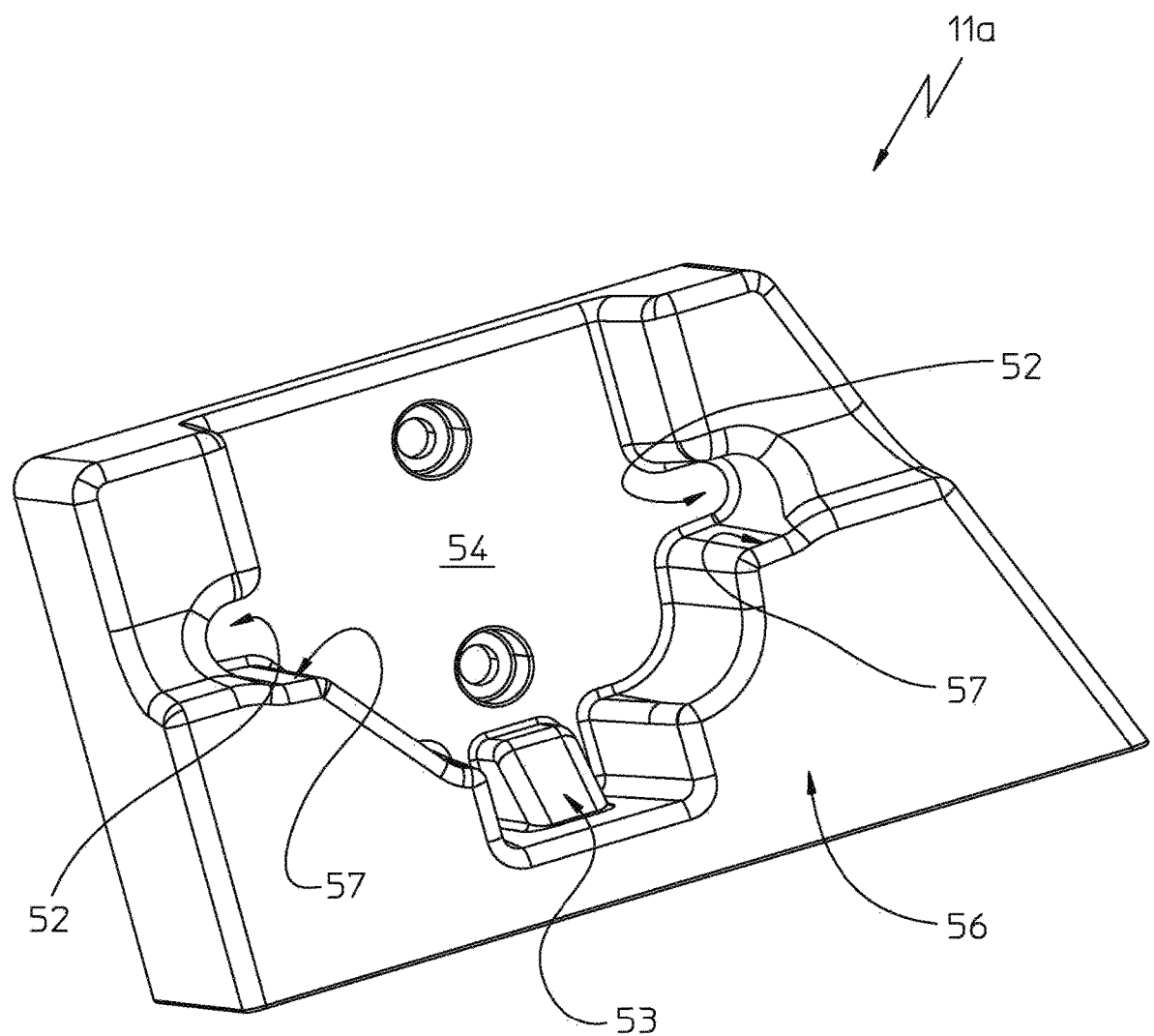
FIG. 8 illustrates a perspective view of the first support according to FIG. 6 looking at the first receiving space.

FIGS. 6-8 illustrate the first support 11 in the first embodiment of the invention. In this first embodiment the first support is designated with the reference numeral 11a. The first support 11a cooperates with the first end cap 16a as will be described infra.

The front view of the first support 11a according to FIG. 6 initially shows a receiving space 50 that is open in upward direction as well as towards the first end cap 16a or towards the second support 12. The wall 51 that defines the receiving space 50 essentially assumes a shape of an outer contour of the first end cap 16a and is thus configured with a complementary shape. In particular the wall 51 defines recesses 52 in which the shoulders 35 of the first end cap 16a can rest. Thus, the recesses 52 facilitate retrieving the inserted first end cap 16a only in the transversal direction of the vehicle, thus in the direction towards the second support 12.

Furthermore a centering device configured as a rigid centering contour configured by the support or also designated as centering protrusion enters into the receiving space 50.

FIG. 7 illustrates the first support 11a in a sectional view according to the sectional line B-B. This illustration shows the entry of the centering contour into the receiving space 50 which extends from a rear wall 54 to a front surface 55 and which corresponds in a depth that is measured along the longitudinal axis of the winding shaft housing approximately to the extension of the shoulders 35 of the first end cap 16a that is measured along the longitudinal axis of the winding shaft.

The first support 11a forms a support protrusion 56 in front of the receiving space 50, thus in front of the front surface 55 in a direction towards the second support.

It is evident from FIG. 7, in particular however also from the perspective view of the first support 11a that the support protrusion 56 forms a support structure configured as an upward oriented support plateau 57 which extends over an entire length of the support protrusion 56 along the longitudinal axis of the vehicle.

Figure 9:
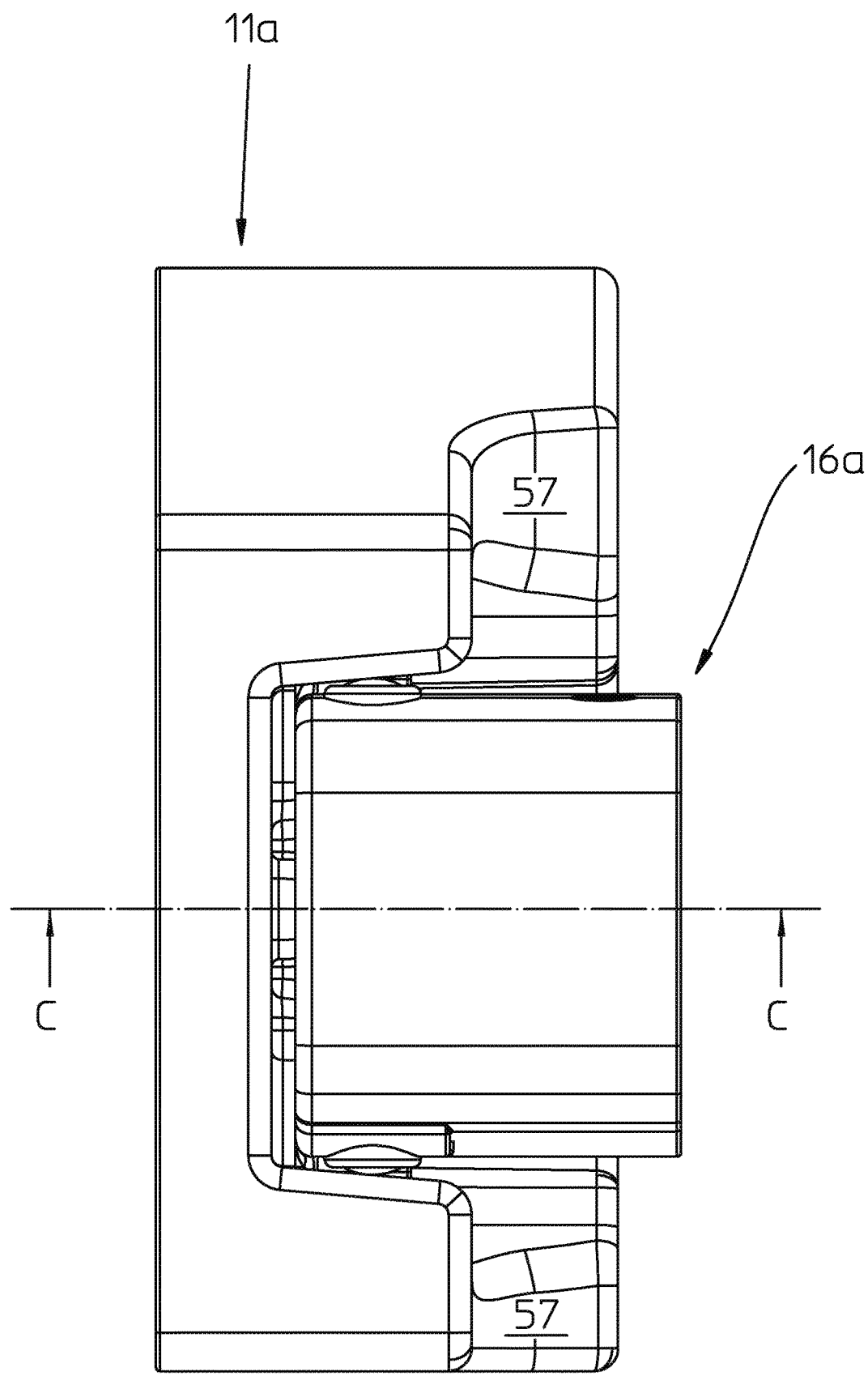
FIG. 9 illustrates a top view of a functional pairing of the first support and the first end cap.
Figure 10:
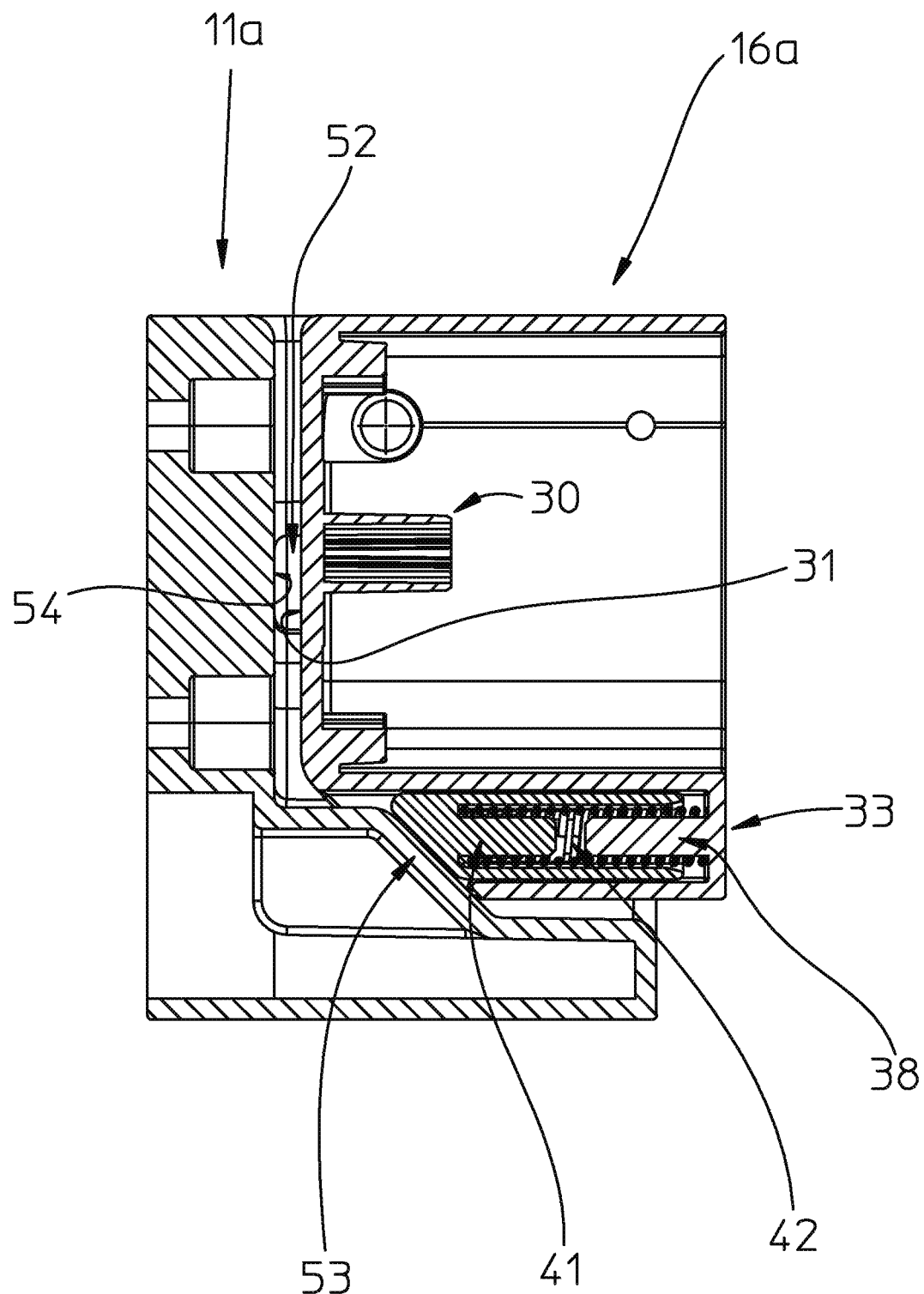
FIG. 10 illustrates a sectional view of the functional pairing of FIG. 9 according to the sectional line C-C.

FIGS. 9 and 10 illustrate a functional pairing between the first support 11a and the first end cap 16a in the first embodiment of the invention. The first end cap 16a rests in the first support 11a in the receiving space 50 wherein the shoulders 35 of the first end cap 16a are inserted into the recesses 52 of the first support 11a. FIG. 9 illustrates the functional pairing in a top view. FIG. 10 illustrates a sectional view of the functional pairing according to the sectional line C-C in FIG. 9.

It is evident that a centering device configured as a centering plunger 41 is inserted into the centering device support 33, wherein the centering plunger 41 exits from the opening 40 of the support space 37 in order to cooperate with the centering contour 53 of the first support 11a. A spring element 42 configured as a coil spring is supported on the support pin 38 of the centering device support 33 and urges the centering plunger 41 against the centering contour 53.

An orientation of the surface of the centering contour 53 that is oriented towards the centering plunger, a slanted centering surface that slopes downward and towards the second support and the face of the centering plunger, a slanted centering surface that is oriented parallel to the slanted surface of the centering contour 53 cause a conversion of the spring force of the spring element 42 that is oriented in a longitudinal axial direction of the winding shaft into an upward oriented force component that is oriented away from a base group of the vehicle.

The centering devices of the first support 11a and the first end cap 16a are provided in a structurally similar configuration also in the subsequently described second support 12 and the second end cap 17. Therefore the spring forces of the cooperating centering devices (centering contour 53 and centering plunger 41 in FIG. 10) that are oriented along the longitudinal axis of the winding shaft cause a centering of the winding shaft housing 13 between the supports 11 and 12. The pairing of the slanted centering surfaces of the centering contour 53 and the centering plunger 41 in the functional pairing of the first support 11a and the first end cap 16a cause a centering movement of the winding shaft housing 13 and an upward oriented movement of the first end cap 16a in as far as the clearance between the shoulder 35 and the recesses 52 allows. This upward oriented movement or force component causes a bridging of dimensional tolerances and an essentially sound free and rattle free support of the first end cap 16a in the first support 11a.

Only for completeness sake it is pointed out that no slanted surface pairing is required for causing an upward oriented movement or an upward oriented force component. The slanted surface pairing is advantageous but it is sufficient when one of the slanted surfaces impacts the corresponding centering device, thus either the centering protrusion 53 or the centering plunger 41.

Figure 11:
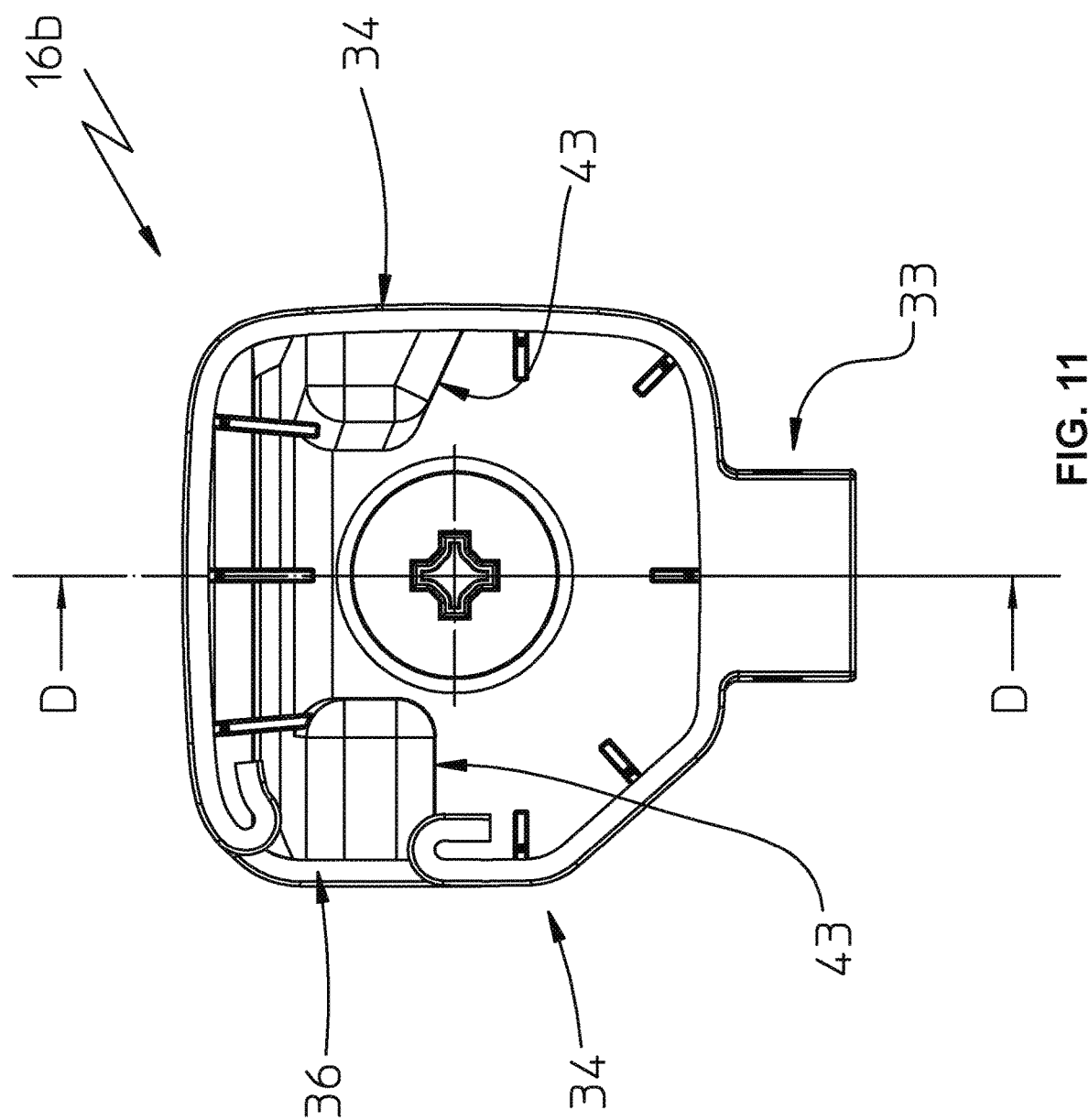
FIG. 11 illustrates a view of an inside of a first end cap in the second embodiment.
Figure 12:
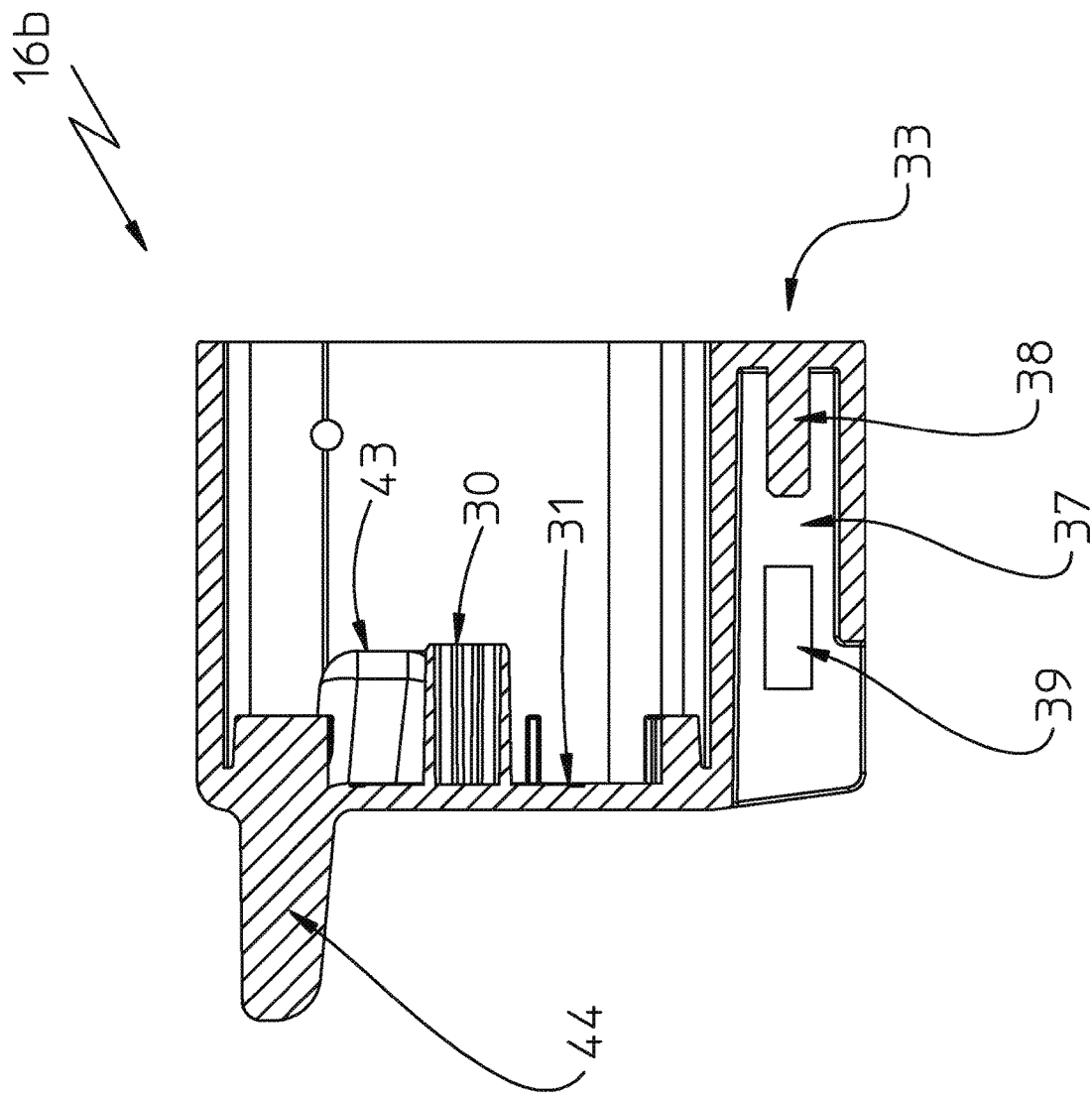
FIG. 12 illustrates a sectional view of the first end cap according to the sectional line D-D in FIG. 11.
Figure 13:
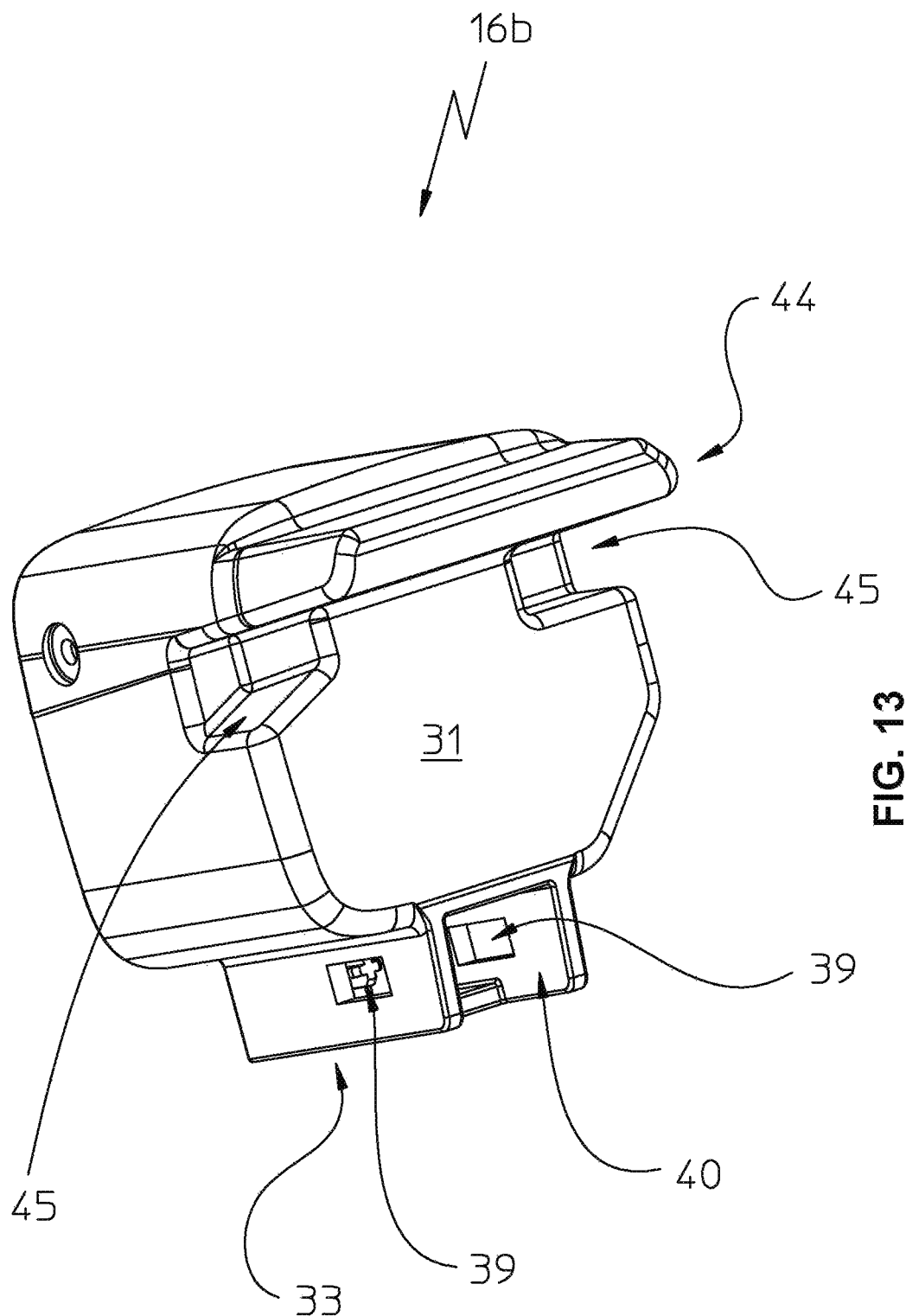
FIG. 13 illustrates a perspective view of a face of the first end cap according to FIG. 11.

FIGS. 11-13 illustrate a second embodiment of the first end cap 16 that is overall designated with the reference numeral 16b.

FIG. 11 illustrates a view of an inside of the end cap 16b whose face wall 31 also has an axial protrusion 30 configured to provide a rotation bearing for the winding shaft that is not illustrated. Also the end cap 16b has side walls 34 that are oriented in the longitudinal direction of the vehicle but which lack shoulders. The side wall 34 that is oriented towards the rear of the vehicle also includes a clear cut 36 that is aligned with the exit slot 15 of the winding shaft housing 13. The side walls 34, however, include housing contractions 43.

FIG. 12 illustrates the second embodiment of the end cap 16b according to the sectional line D-D in FIG. 11. It is evident that also the second end cap 16b forms a centering device support 33 with a support space 37, a support pin 38 and an interlocking window 39 at a bottom side of the second end cap and differently from the end cap 16a according to the first embodiment a support pin 44 that is oriented along the axis of the winding shaft housing protrudes from the face wall 31, FIG. 13, however, illustrates a perspective view of the first end cap 16b according to a second embodiment with an illustration of the outer surface of the face 31. This illustration clearly shows the support pin 44 that protrudes in a longitudinal axial direction of the winding shaft. In particular the interlocking grooves 45 that are formed by the housing contractions 34 are visible quite well in this illustration. The centering device support 33 is also illustrated that includes a support cavity 37 with interlocking windows 39 wherein the support cavity is accessible in a direction towards the second support 12 through an opening 40 wherein the interlocking windows fix the centering device so that it is movable in the direction parallel to the longitudinal axis of the winding shaft.

Figure 14:
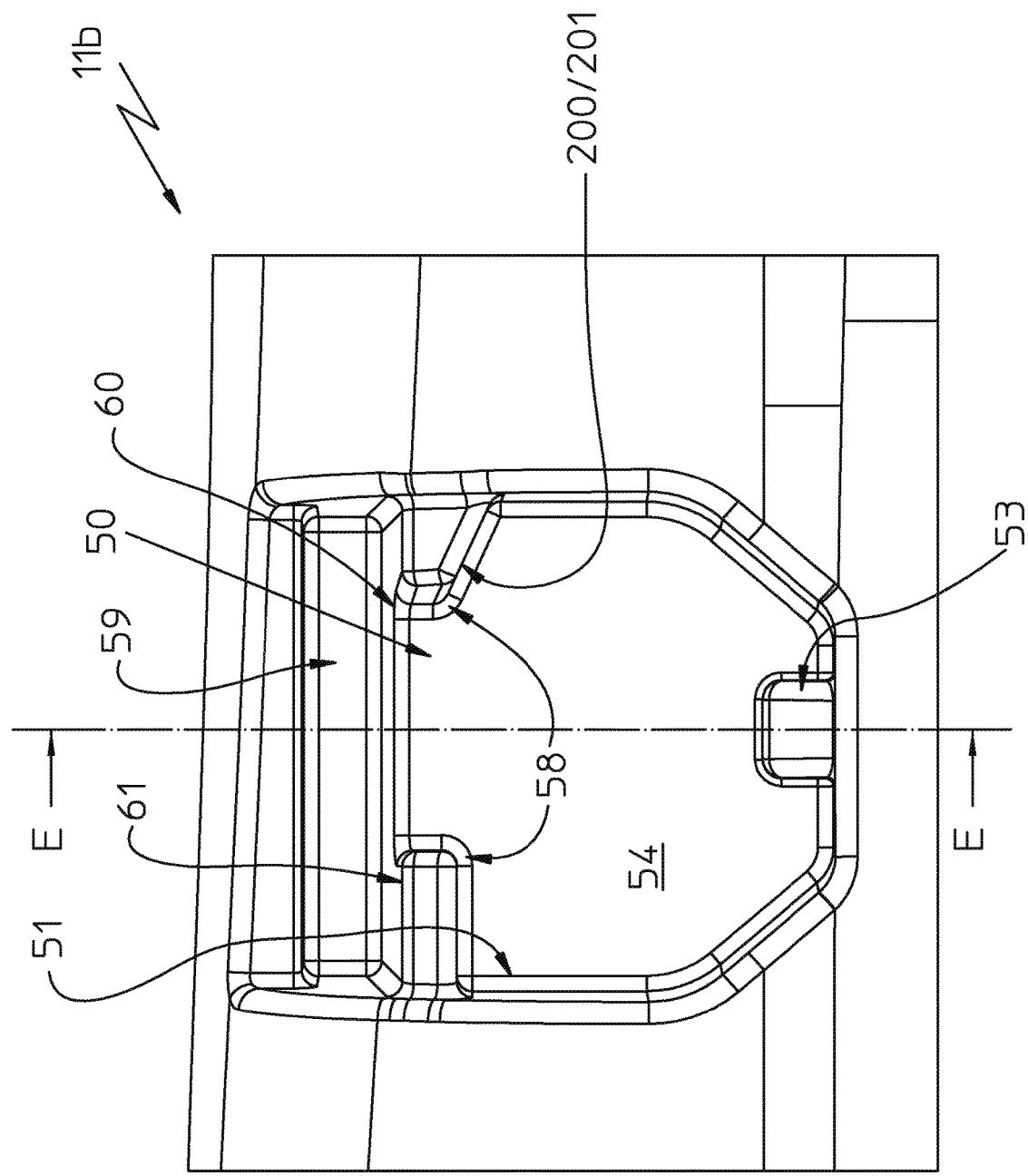
FIG. 14 illustrates a first support in an alternative embodiment looking at the first receiving space.
Figure 15:
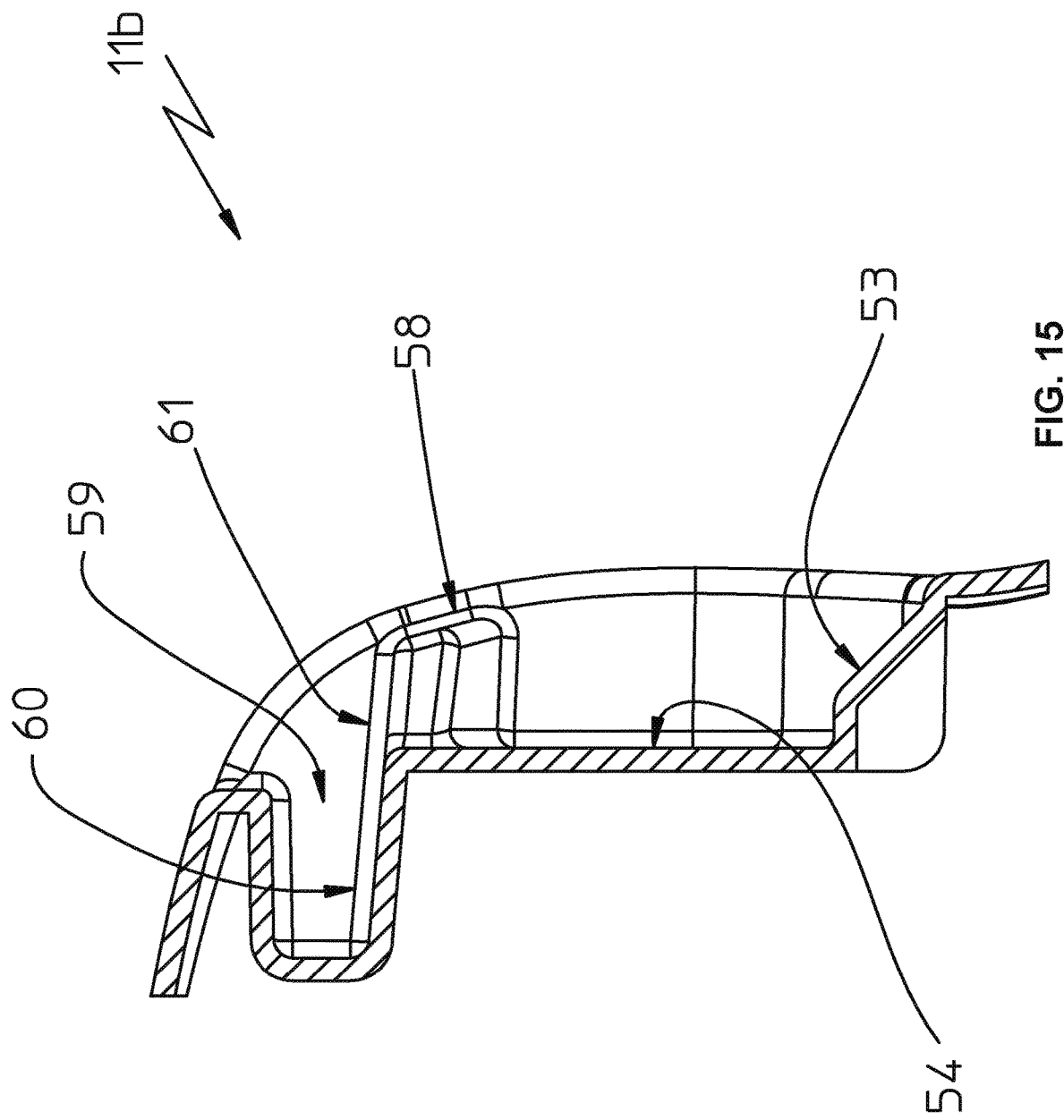
FIG. 15 illustrates a sectional view of the alternative first support according to the sectional line E-E in FIG. 14.
Figure 16:
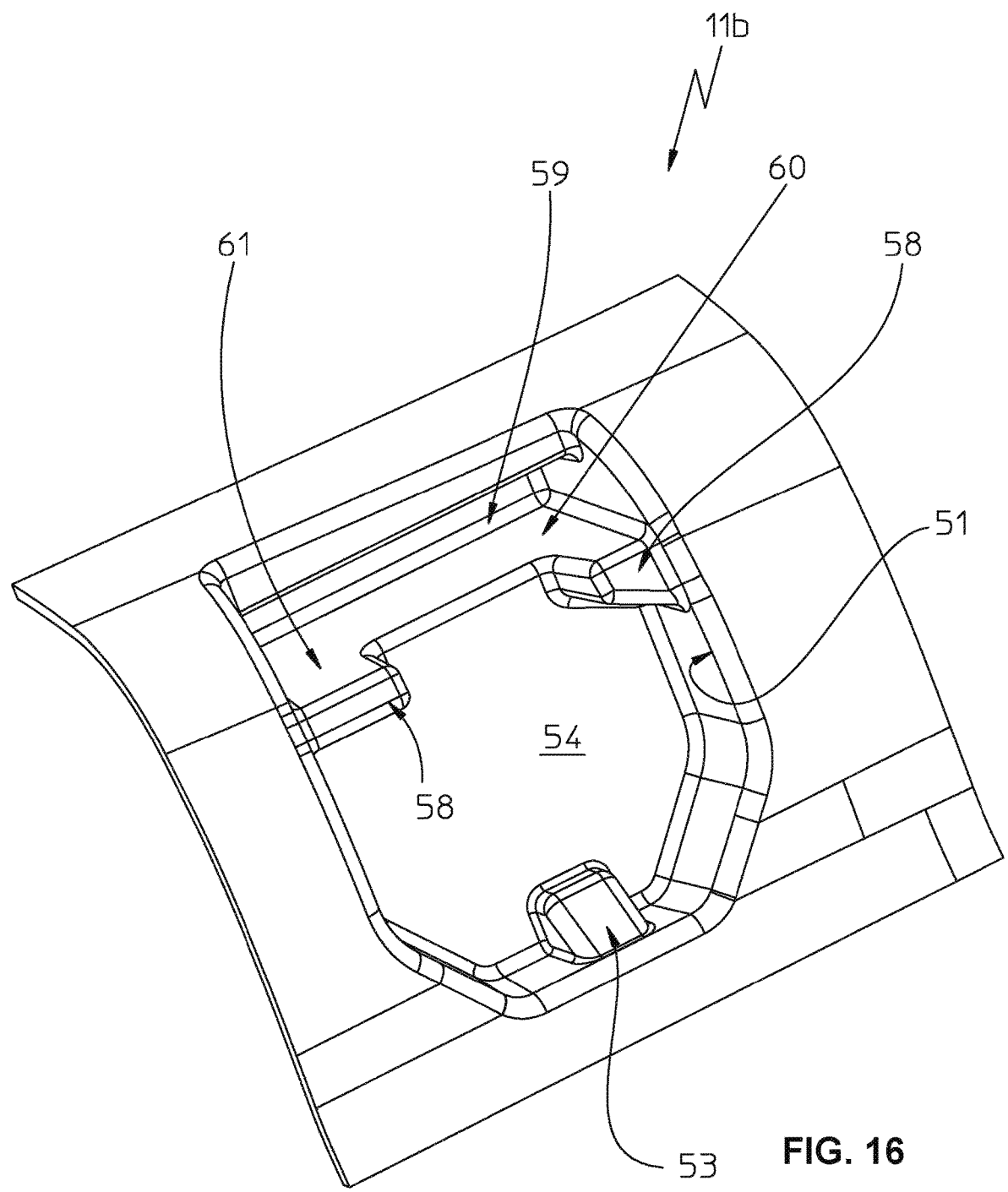
FIG. 16 illustrates a perspective view of the first support in an alternative embodiment including an illustration of the first receiving space.

In order to cooperate with the second embodiment of the first end cap 16b illustrated in FIGS. 11-13, the second embodiment of a first support 11b is provided as illustrated in FIGS. 14-16. In FIG. 14 the first support 11b is illustrated looking at its receiving space 50 which is defined by a rear wall 54 in a direction towards the body and by a wall 51 in the longitudinal direction of the vehicle. This wall 51 is open in upward direction like in the embodiment of the first support 11a. In the lower portion a centering contour or a centering protrusion extends into the receiving space 50, interlocking lugs 58 that are oriented radially inward parallel to the winding shaft housing 13 constrict the receiving space 50. Additionally a guide space 59 is arranged above the interlocking lugs 58 that extends in an axial direction of the winding shaft housing or in a direction of the body. Thus, the guide space 59 is recessed relative to the rear wall 54. The base surface 60 that defines the support cavity 59 in downward direction is oriented at the same level with a top side of the anchoring lugs 58 so that they jointly form a support surface. The second embodiment of the first support 11b lacks recesses 52 as evident from FIG. 14 in particular also from the perspective view according to FIG. 16.

FIG. 15 illustrates a sectional view of the first support 11b according to the sectional line E-E in FIG. 14 and illustrates the structures described supra as well as does FIG. 16. It is evident in particular from the sectional view in FIG. 15 that the support space 59 is oriented axially in a direction towards the body is recessed relative to the rear wall 54. It is also clearly evident that the guide surface 61 includes the top side of the anchoring lugs 48 and the base surface 60 of the support space 59. The centering contour 53 that extends in a direction of the second support 12 or in a direction of the winding shaft housing 13 into the receiving space 50 is also clearly visible in the sectional view according to FIG. 15 as well as from the perspective view according to FIG. 16.

FIGS. 15 and 16 however show a significant difference from the first embodiment. The support protrusion 56 provided in the first embodiment is missing in the second embodiment of the first support 11b.

FIG. 14 furthermore illustrates a positioning device 200. Using the positioning device the cargo space cover 10 is arrangeable within the first support 11b in a defined position with respect to a longitudinal axis of the vehicle. Thus, the positioning device 200 is a slanted surface 201 that is formed in the receiving space 50 in front of the wall 51, thus in particular by the interlocking lug 52 and that is arranged within the receiving space 50 in a direction towards a front of the vehicle. The slanted surface 201 is oriented transversal to the rear wall 54 and slopes downward in a direction towards a front of the vehicle. The winding shaft housing 13, thus the first end cap 16 is pressed from below against the slanted surface 201 and slides on the slanted surface 201 in a direction towards the rear of the vehicle. This provides a defined contact that the wall 51 of the receiving space 50. Thus the slanted surface 201 is arranged so that a movement of the winding shaft housing 13 in a direction towards a rear of the vehicle is indicated since this is also the movement direction or the force vector of the cover web 14 while being pulled off from the winding shaft. This reinforces the contact of the winding shaft housing. An opposite orientation and effect of the winding shaft housing 201 is conceivable, however bears the risk that pulling the cover web 14 off compensates the contact force. In this case the winding shaft housing 13 is not supported in a defined manner anymore when the cover web 14 is pulled off but supported in a floating manner which can lead to rattling noises.

Figure 17:
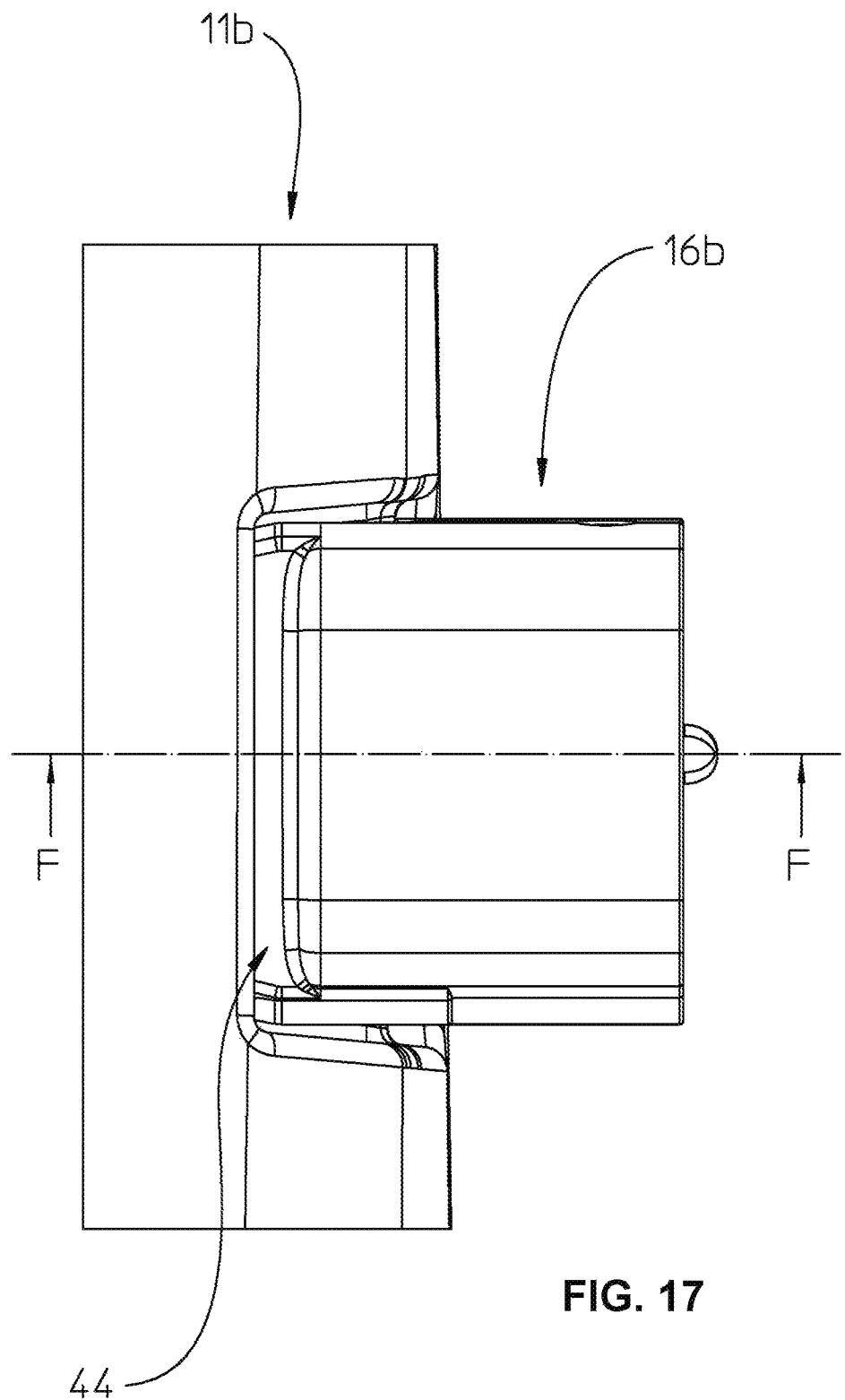
FIG. 17 illustrates a top view of the functional pairing of the first support and the first end cap in an alternative embodiment according to FIG. 11 or 14.
Figure 18:
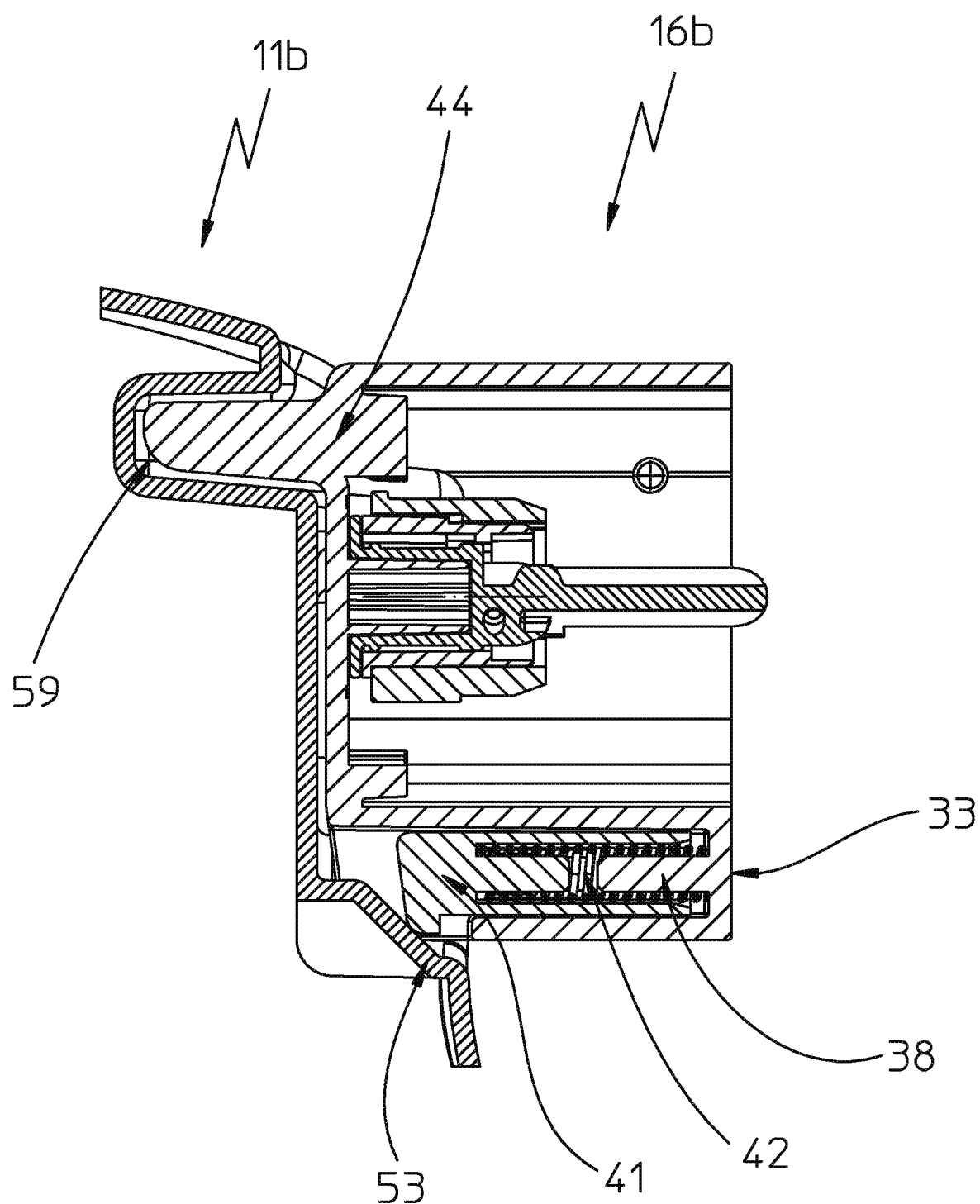
FIG. 18 illustrates a sectional view of the functional pairing in FIG. 17 according to the sectional line F-F.

FIGS. 17 and 18 illustrate the functional pairing of the second embodiment of the first support 11b and the first end cap 16b in cooperation in analogy to FIGS. 9 and 10. Thus, FIG. 17 illustrates a view from above whereas FIG. 18 illustrates a sectional view according to the sectional line F-F in FIG. 17.

It is appreciated that the first end cap 16b supports a centering plunger within the first centering device support 33 in analogy to the first end cap 16a wherein the centering plunger can exit through the opening 40 of the support cavity 37 due to force loading by a spring element 42 configured as a coil spring and can cooperate with the centering protrusion 53. The spring element 42 itself is fixed on the support pine 38.

The centering contour 53 of the first support 11b is provided with a downward slanted surface that is oriented towards the opposite second support in analogy to the first support 11a. Differently from the illustration in FIG. 10 the first end cap 16b includes a centering plunger whose face wall is configured almost vertical so that only its lower edge contacts the slanted surface of the centering protrusion 53. As already stated with respect to FIG. 10 the slanted surface of the centering protrusion 53 suffices in order to lift the end cap 16b by a vertical force component that is obtained by the centering protrusion 53 in addition to centering the winding shaft housing 13 in the transversal direction of the vehicle.

FIG. 18 furthermore shows the engagement of the support pin 44 and the support cavity 49 as apparent from a view of FIGS. 13 and 16 in combination but not illustrated in the sectional plane. The interlocking lugs 58 engage the interlocking grooves 45.

Like in the functional pairing of the first embodiments of first support 11a and first end cap 16a also the functional pairing according to FIGS. 17 and 18 of the first embodiments of first support 11b and first end cap 16b can be disengaged only by a retrieval movement of the first end cap 16b from the receiving space 50 of the first support 11b that is oriented parallel to the transversal axis of the vehicle. The transversal centering of the winding shaft housing between the first support 11b and a second support 12 is provided by the described functional pairing between the centering contour 53 and the centering plunger 41 wherein also a comparable centering device pairing is provided by the second support 12 and the second end cap 17. The vertical force component caused by the slanted centering surface of the centering protrusion 53 urges the first end cap 16b vertically upward according to FIG. 18 so that in particular the interlocking lugs 58 are inserted into the interlocking grooves 45 without clearance so that possible disturbing noises like rattling are reliably prevented.

Figure 19:
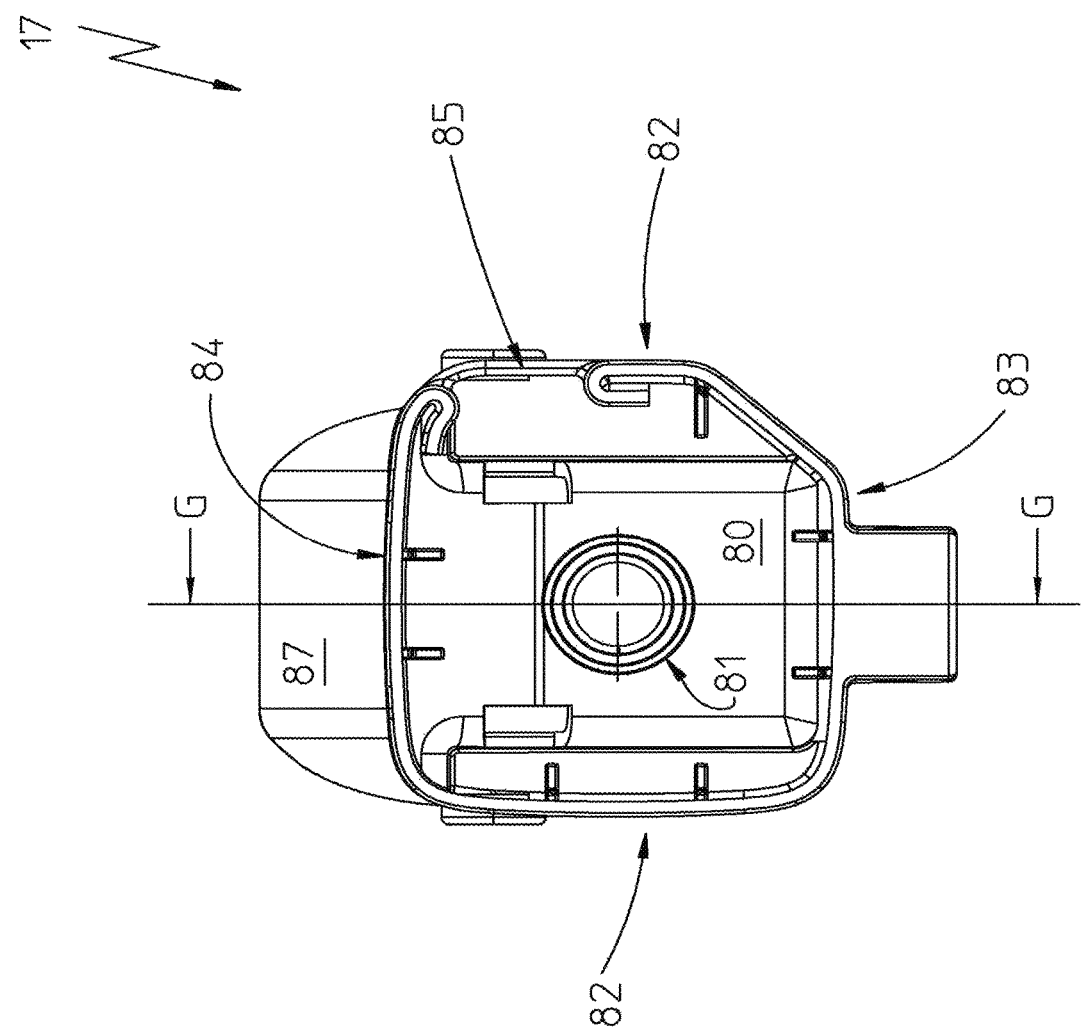
FIG. 19 illustrates a view of an inside of a second end cap of the cargo space cover according to the invention.
Figure 20:
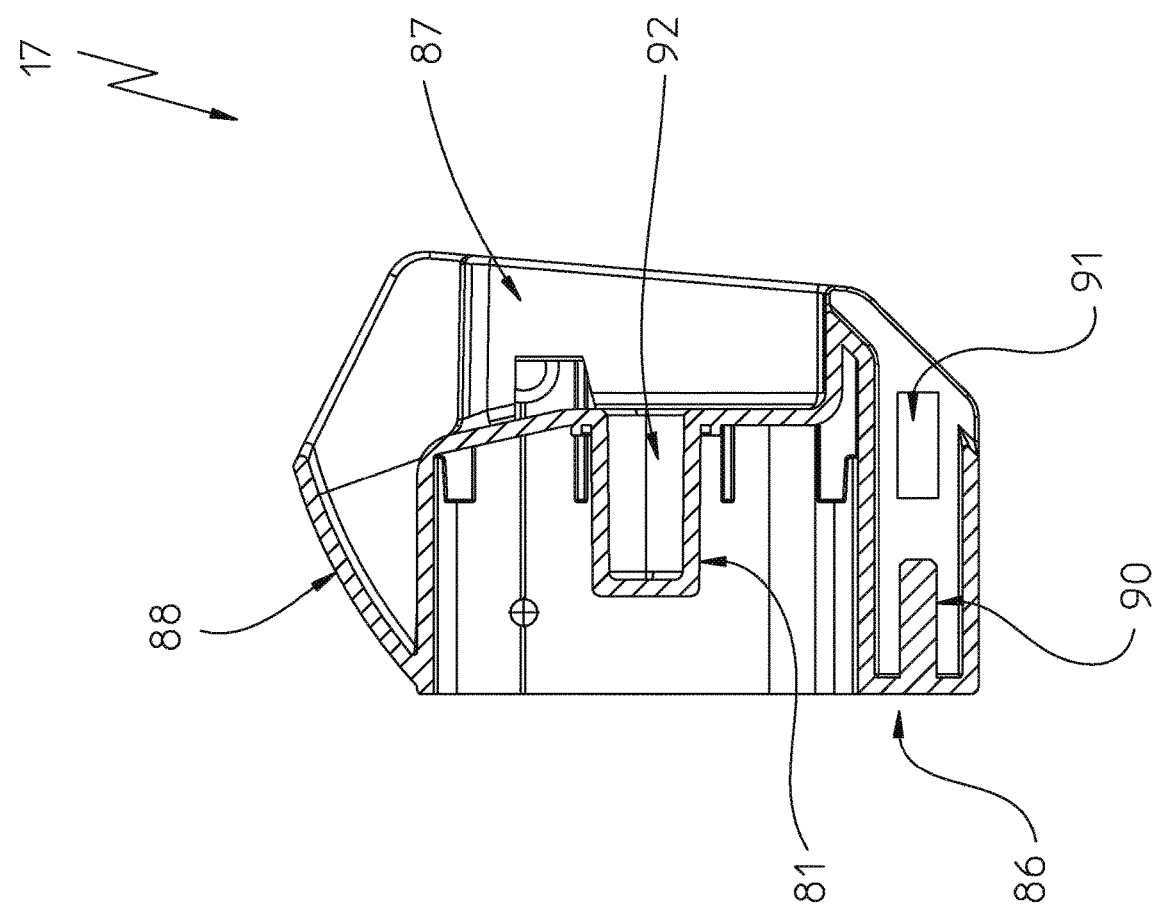
FIG. 20 illustrates a sectional view of the end cap according to the sectional line G-G in FIG. 19.
Figure 21:
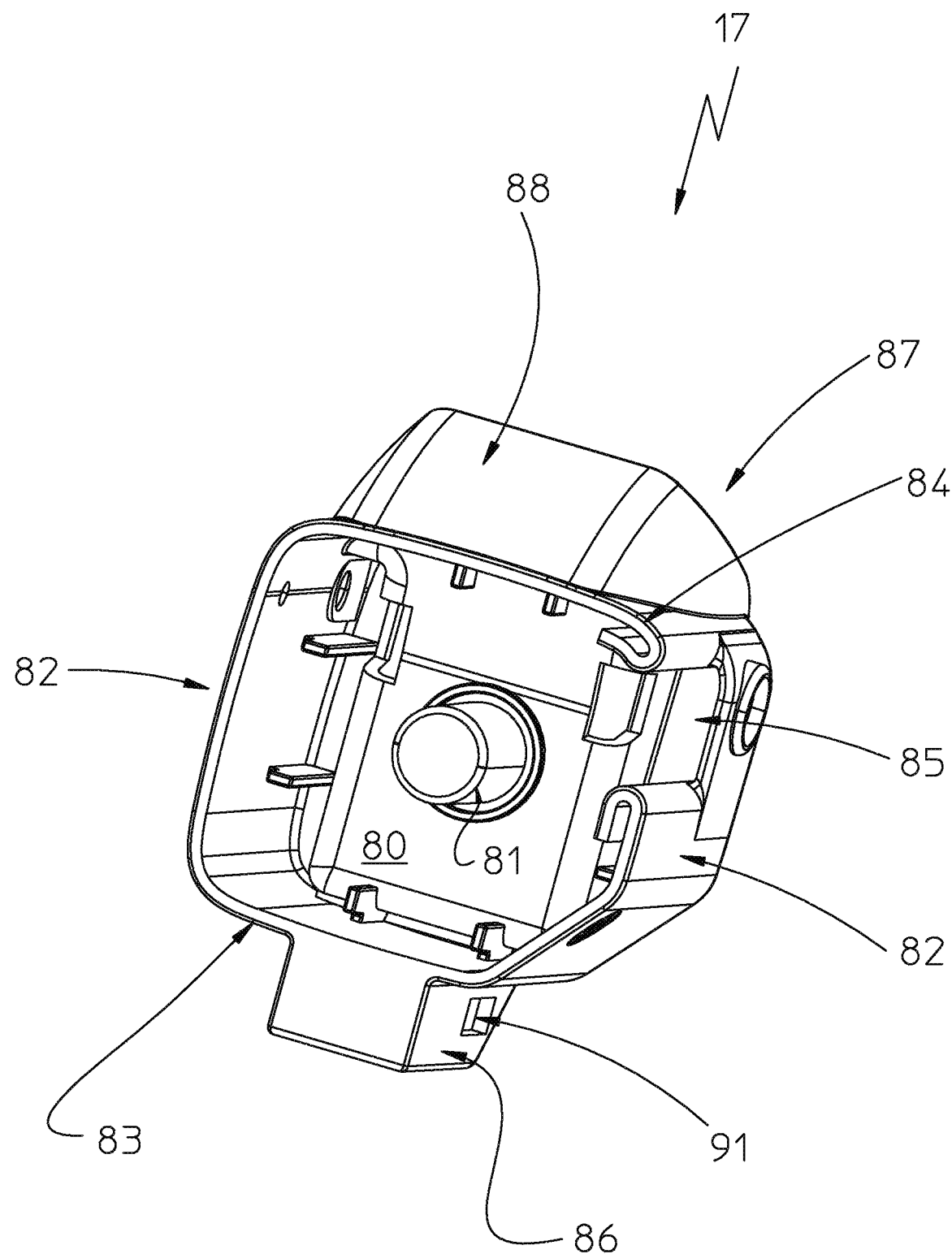
FIG. 21 illustrates a perspective view of an inside of the second end cap according to FIG. 19.

FIGS. 19-21 show a second end cap 17 according to the invention. The second end cap 17 can be used in combination with the first and the second embodiment of the first support 11a, 11b and first end cap 16a, 16b. The second end cap is arranged opposite to the respective end cap 11a, 11b at the winding shaft housing.

FIG. 19 illustrates a view of an inside of the second end cap 17. The second end cap 17 includes a rear wall 80 that is oriented towards the second support 12 with an inward oriented axial protrusion 81 which provides a rotation bearing for the winding shaft that is not illustrated, Side walls 82 that are oriented in a longitudinal direction of the vehicle envelop a receiver for the winding shaft housing 13 together with a base wall 83 and a cover wall 84.

The side wall 82 that is oriented towards the rear of the vehicle is provided with a clear cut 85 which is aligned with the exit slot of the winding shaft housing in order to assure the exit of the cover web 14.

The base wall 83 is provided with a centering device support 86. The second end cap 17 forms a locking bar housing 87 in the portion of the cover wall 84.

FIG. 20 represents a sectional view of the second end cap 17 according to the sectional line G-G in FIG. 19, The locking element housing 87 is open towards the non-illustrated second support 12 and includes a cover surface 88 which has a cambered shape. The camber runs along a circular arc whose radius corresponds to approximately to the pivot radius of the pivotable locking bar which is not illustrated but which has to be received in the locking element housing.

The centering device support 86 forms a support space 89 in which a centering device is inserted that will be described infra. A support pin 90 extends into the support space 89. The side wall that envelops the support space 89 is provided with interlocking windows 91. Last not least the inward oriented axial protrusion forms a storage space 92 that is open in a direction towards the locking element housing 87 in which as described infra a locking key is insert able that cooperates with the pivotable locking bar. FIG. 21 illustrates a perspective view of the second end cap 17- and thus of the interior space.

Figure 22:
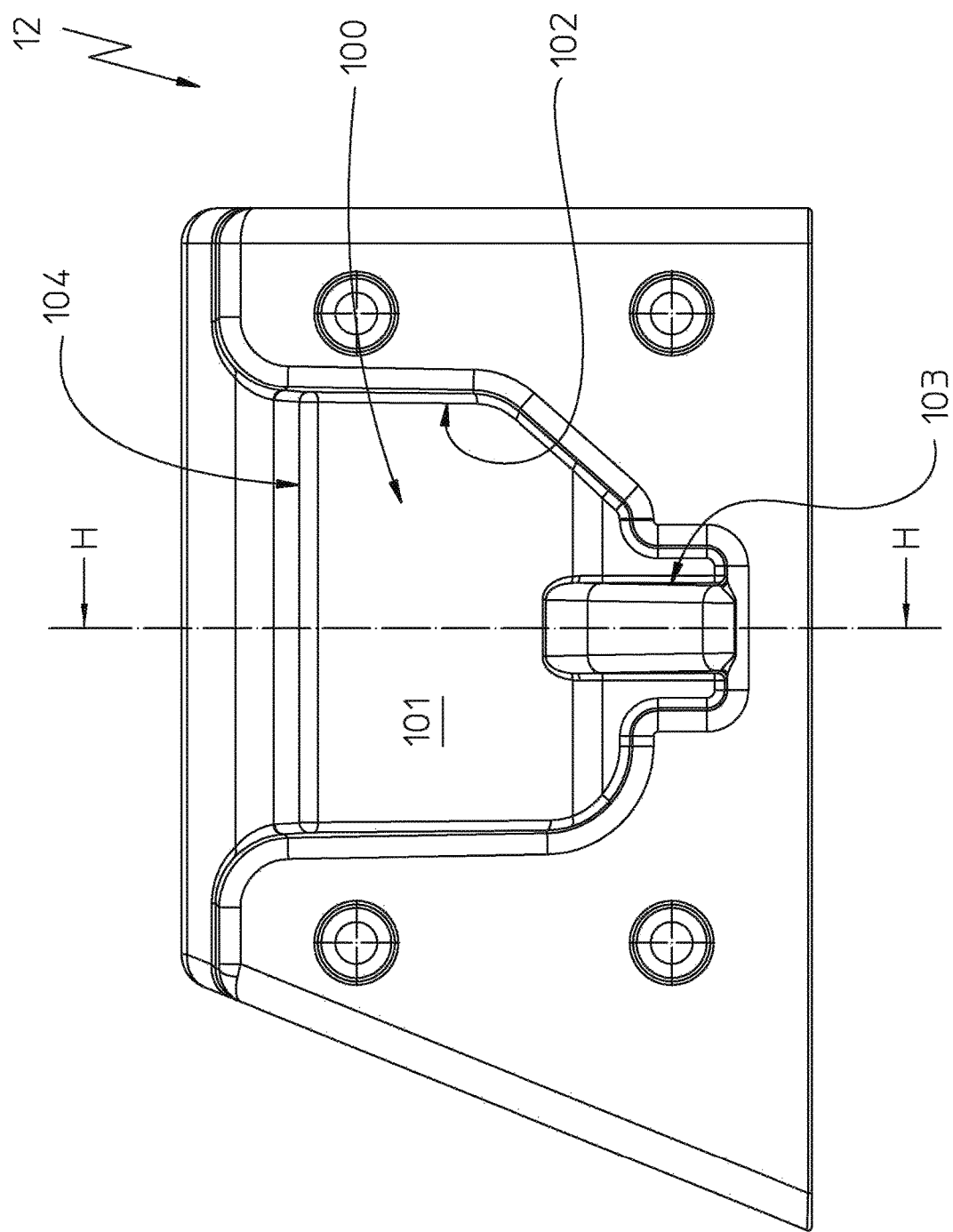
FIG. 22 illustrates a second support of the cargo space cover according to the invention with a view of the receiving space.
Figure 23:
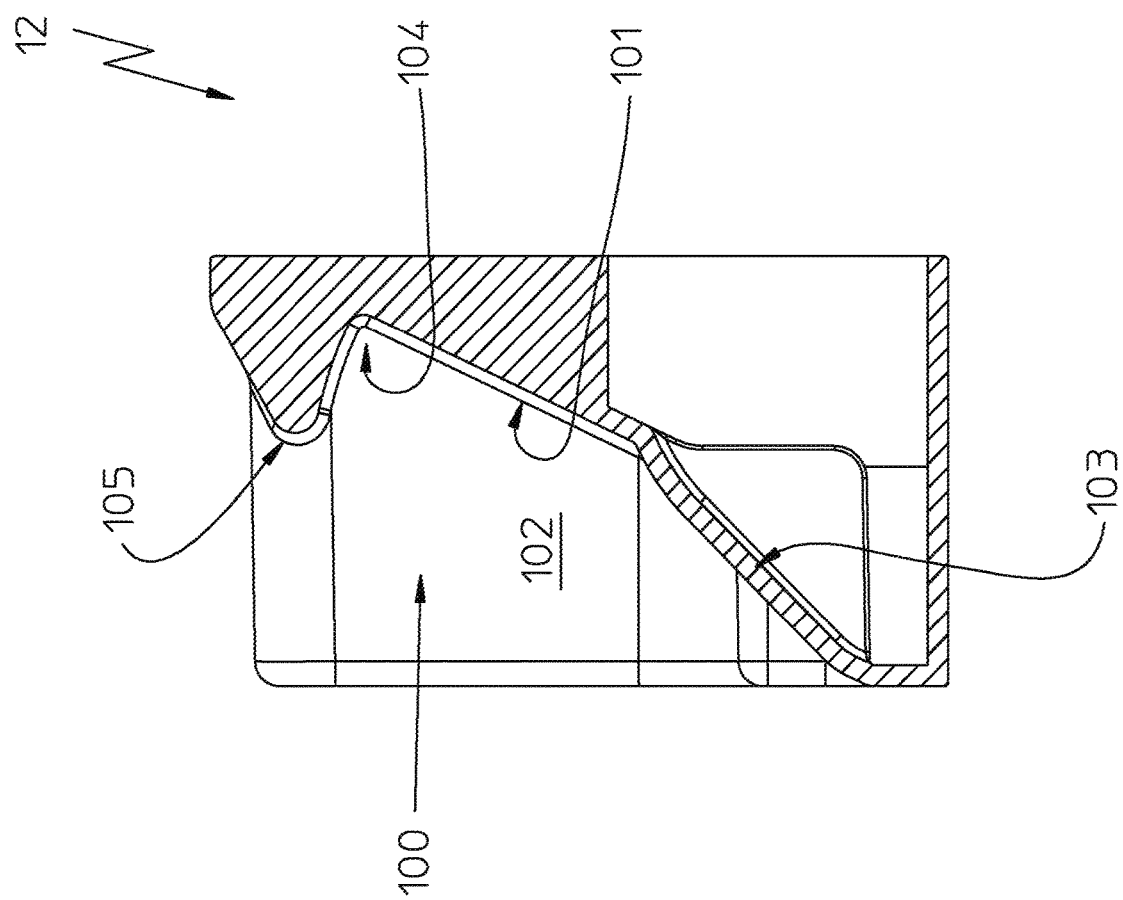
FIG. 23 illustrates a sectional view of the second support according to the sectional line H-H in FIG. 22.
Figure 24:
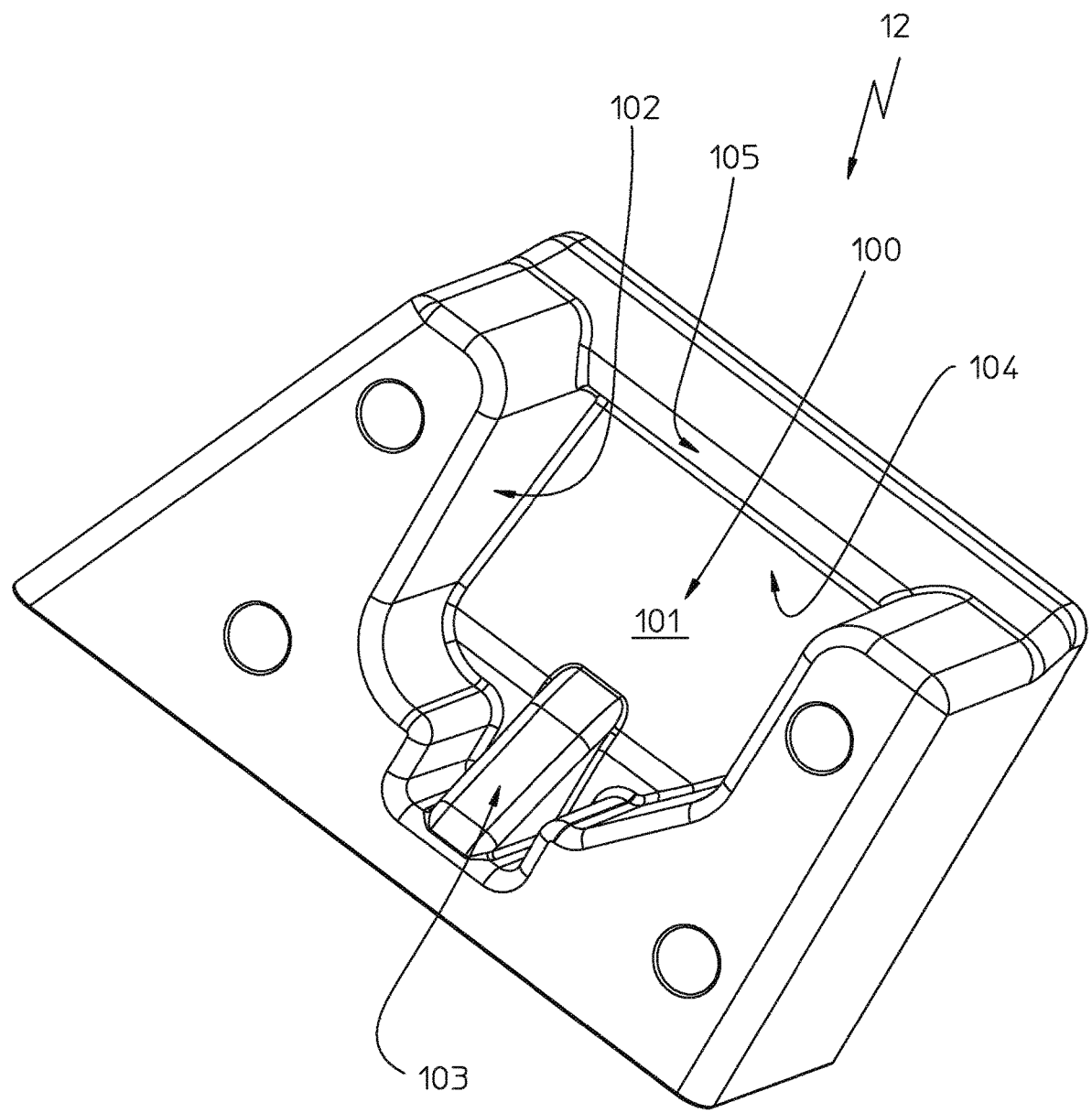
FIG. 24 illustrates a perspective view of the second support according to FIG. 22 with a representation of the receiving space.

FIGS. 22-24 illustrate the second support 12 which cooperates with the second end cap 17 in a functional pairing that will be described infra FIG. 22 illustrates the second support 12 looking at its receiving space 100 which is defined in the transversal direction of the vehicle or in a direction towards the vehicle body by a rear wall 101. In the radial direction with respect to the winding shaft housing the receiving space 100 is defined by a wall 102 that is open in upward direction in order to let the second end cap 17 penetrate through this upper opening into the receiving space 100.

A centering contour 103 penetrates into a lower portion of the receiving space 100 wherein the centering contour is also designated as centering protrusion. Furthermore the rear wall 101 forms a locking element space 104 that is recessed relative to the receiving space 100 in a direction towards the vehicle body.

From FIG. 23 which illustrates a sectional view of the second support 12 according to the sectional line H-H in FIG. 22 it is apparent that the centering protrusion 103 forms a slanted surface that is oriented into the receiving space 100 wherein the slanted surface is sloped downward in a direction towards the first support 11. Additionally it is apparent that the locking element space 104 is defined in upward direction by a locking lug 105 which protrudes in the receiving space and which is oriented in a direction towards the second end cap 17 or the first end cap 11. The position of the individual components of the second support 12 is illustrated again in the perspective according to FIG. 24.

Figure 25:
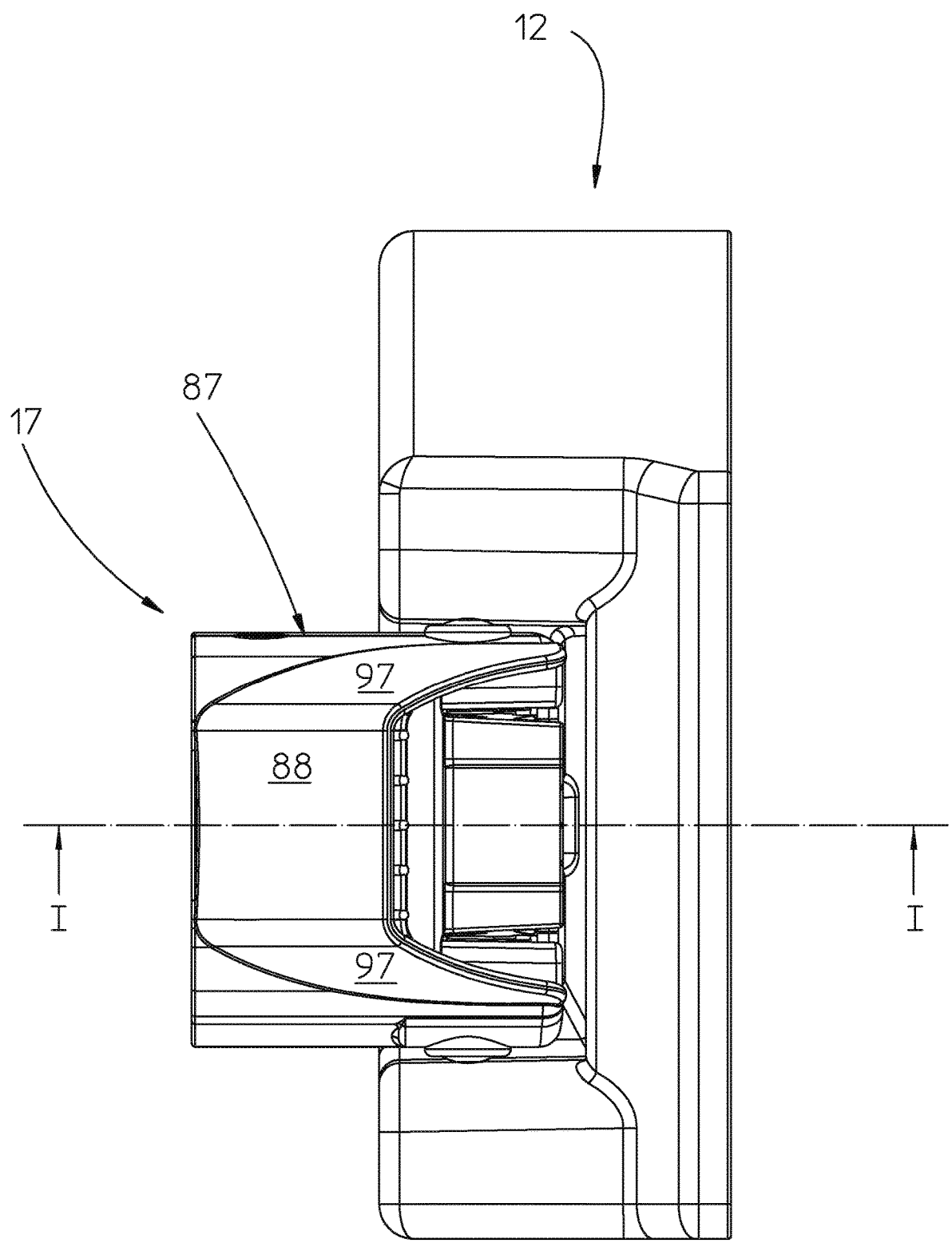
FIG. 25 illustrates a functional pairing of the second end cap and the second support according to FIG. 21 or FIG. 24.
Figure 26:
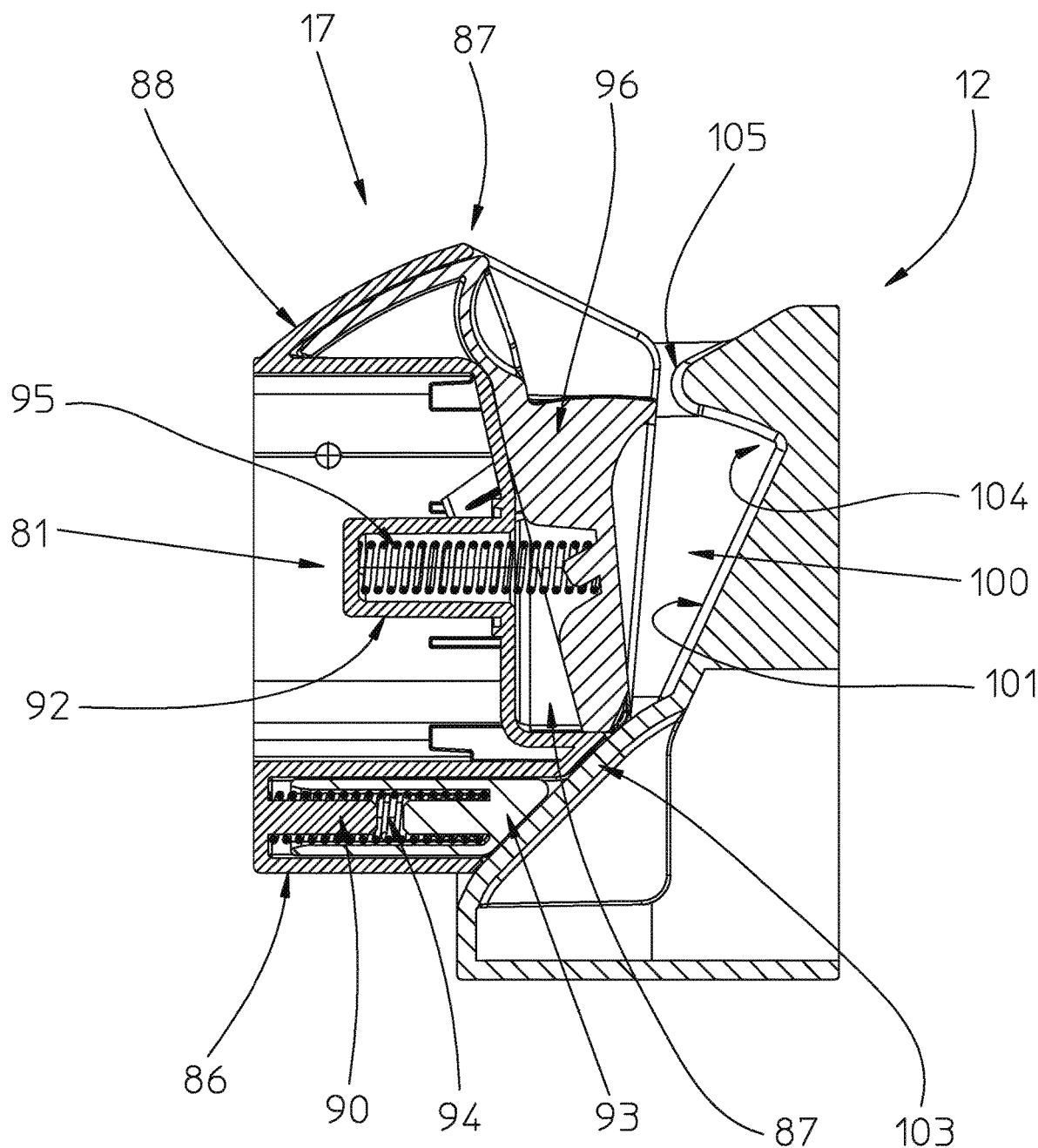
FIG. 26 illustrates sectional views of the functional pairing of second end cap and second support according to FIG. 25 according to the sectional line I-I with a locking element in the unlocking position.
Figure 27:
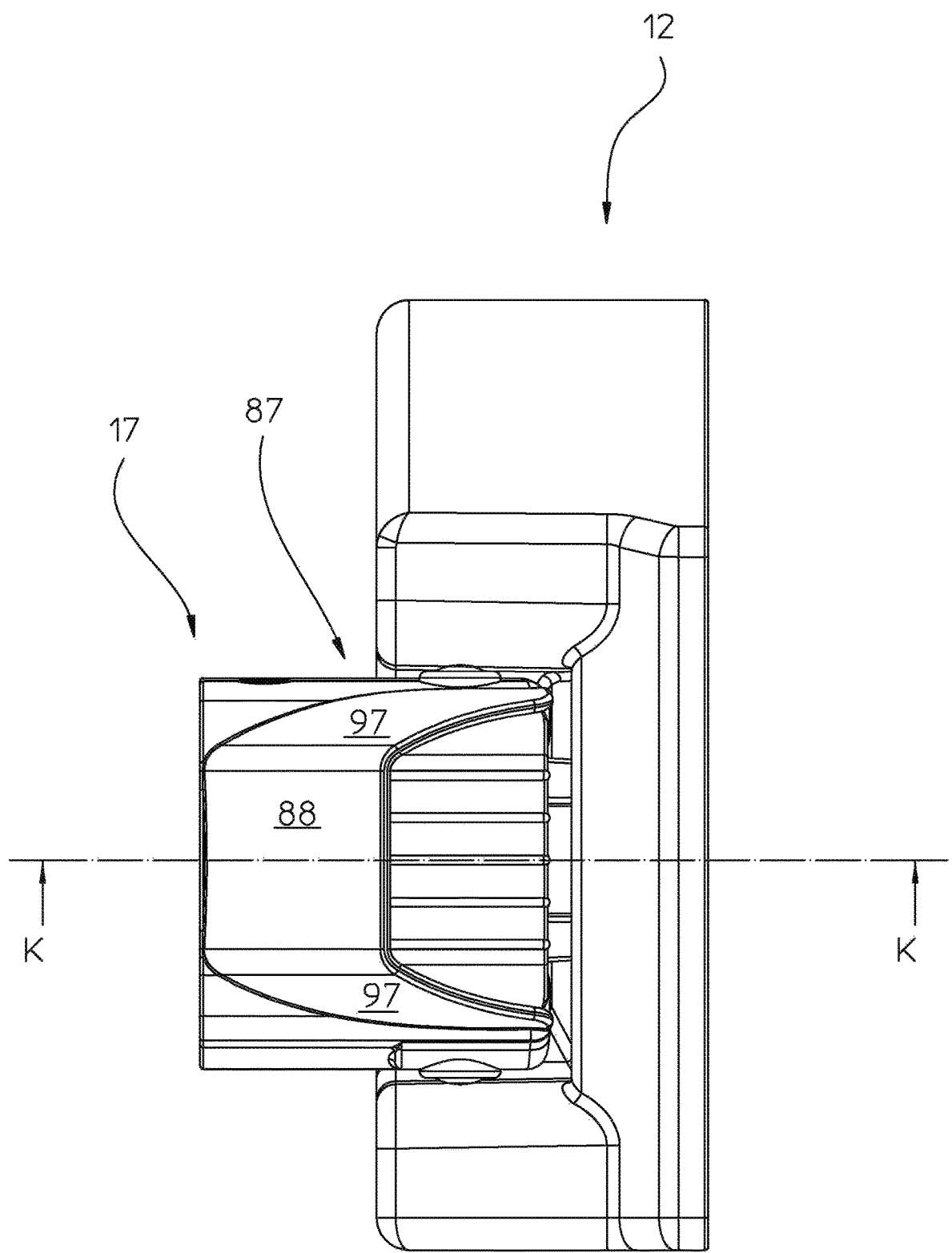
FIG. 27 illustrates a view of the functional pairing of second end cap and second support according to FIG. 25 with an alternative position of the pivotable locking bar.
Figure 28:
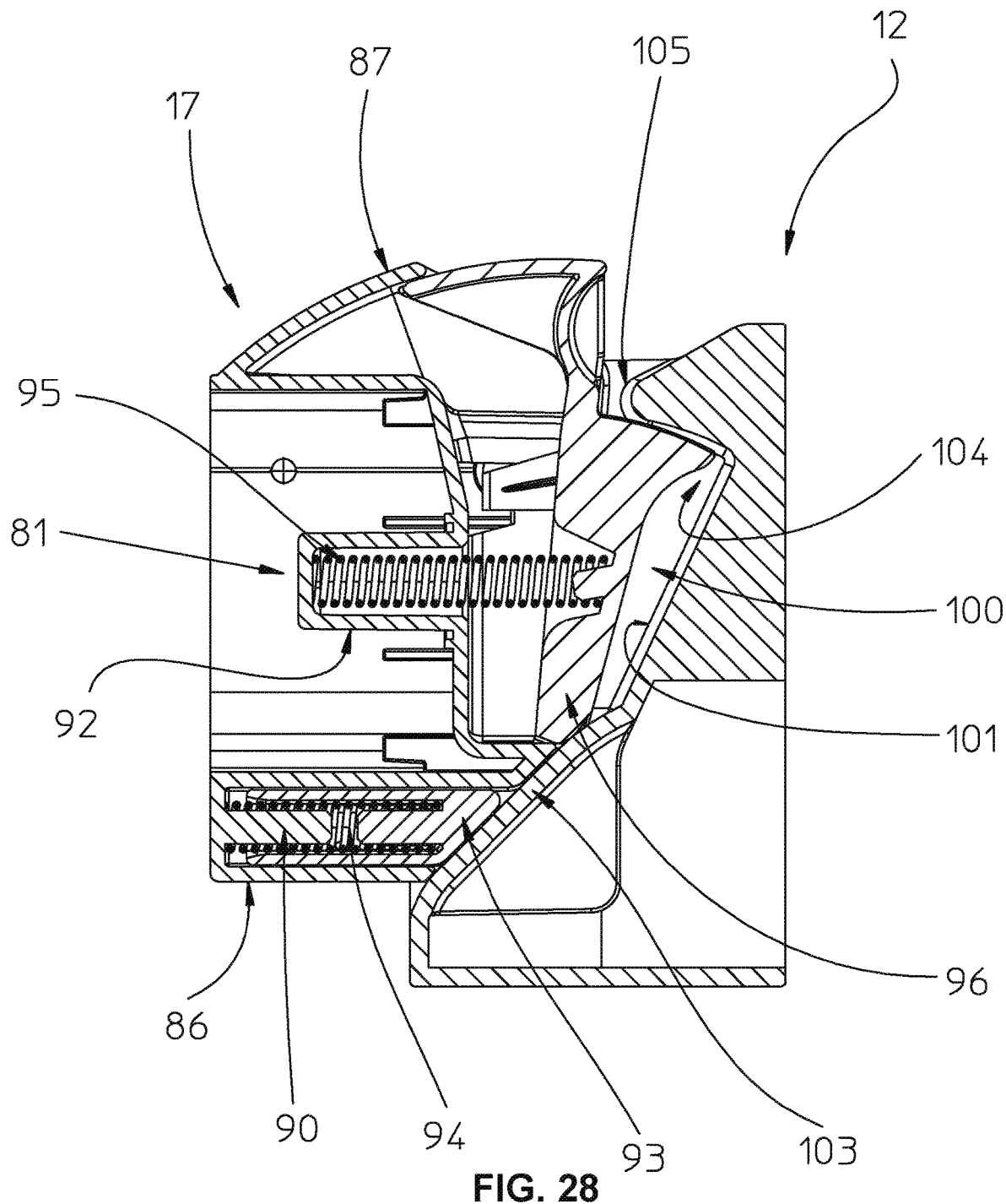
FIG. 28 illustrates a sectional view of the functional pairing according to FIG. 27 according to the sectional line K-K with the pivotable locking bar in the locking position.

FIGS. 25 and 26 illustrate the second support 12 and the second end cap 17 respectively cooperating in a functional pairing wherein FIGS. 25 and 26 show the unlocked condition and FIGS. 27 and 28 show the locked condition, Thus FIGS. 25 and 27 illustrate a top view whereas FIG. 26 illustrates a sectional view according to the sectional line I-I in FIG. 25. FIG. 28 however illustrate a sectional view according to the sectional line K-K in FIG. 27.

The sectional views illustrate the components on the side of the second end cap 17 that are added over FIGS. 19-21. A centering plunger 93 is arranged within the centering device support 86 wherein the centering plunger exits through the opening 89 since it is spring loaded by a spring element 94 configured as a coil spring 94, The coil spring 94 is arranged on the support pin 90 and fixed thereon. The centering plunger is configured analogous to the centering plunger 16 and cooperates in the same way with the centering contour 103 at the support element so that a vertically upward oriented force component is provided in addition to the centering force component in the transversal direction of the vehicle. Furthermore a locking spring 95 is configured in the storage cavity 92 which is formed by the axial protrusion 81, in the instant embodiment a coil spring which impacts the locking bar 96 that is inserted in the locking bar housing 87 and that retains the locking bar in its locking position (c.f. FIG. 28).

When the pivoting locking bar 96 is in the locking position according to FIG. 28, thus penetrates into the locking bar space 100 and is inserted below the locking lug 105 an escape of the second end cap 17 from the receiving space 100 of the second support 12 is not possible. The force component caused by the centering device pairing, the cooperation of centering plunger 93 and centering protrusion 103 causes a reliable contact of the pivoting locking bar at the locking bar lug 105. This way the required clearance and possible dimensional tolerances are bridged and a safe noise free support of the second end cap 17 in the second support 12 is provided.

However, when the pivotable locking bar is pivoted in its unlocked position towards the winding shaft housing 13 or in a direction towards the first support 11 there is no engagement of the pivotable locking bar 96 and the locking lug 105 so that the pivotable locking bar 96 including the second end cap 17 can exit from the receiving space 100 of the second support 12 in upward direction. This in turn supports the centering device pairing including the centering plunger 93 and the centering protrusion 103 whose vertical force component lifts the second end cap 17 vertically at least partially and thus performs and ejector function.

Figure 29:
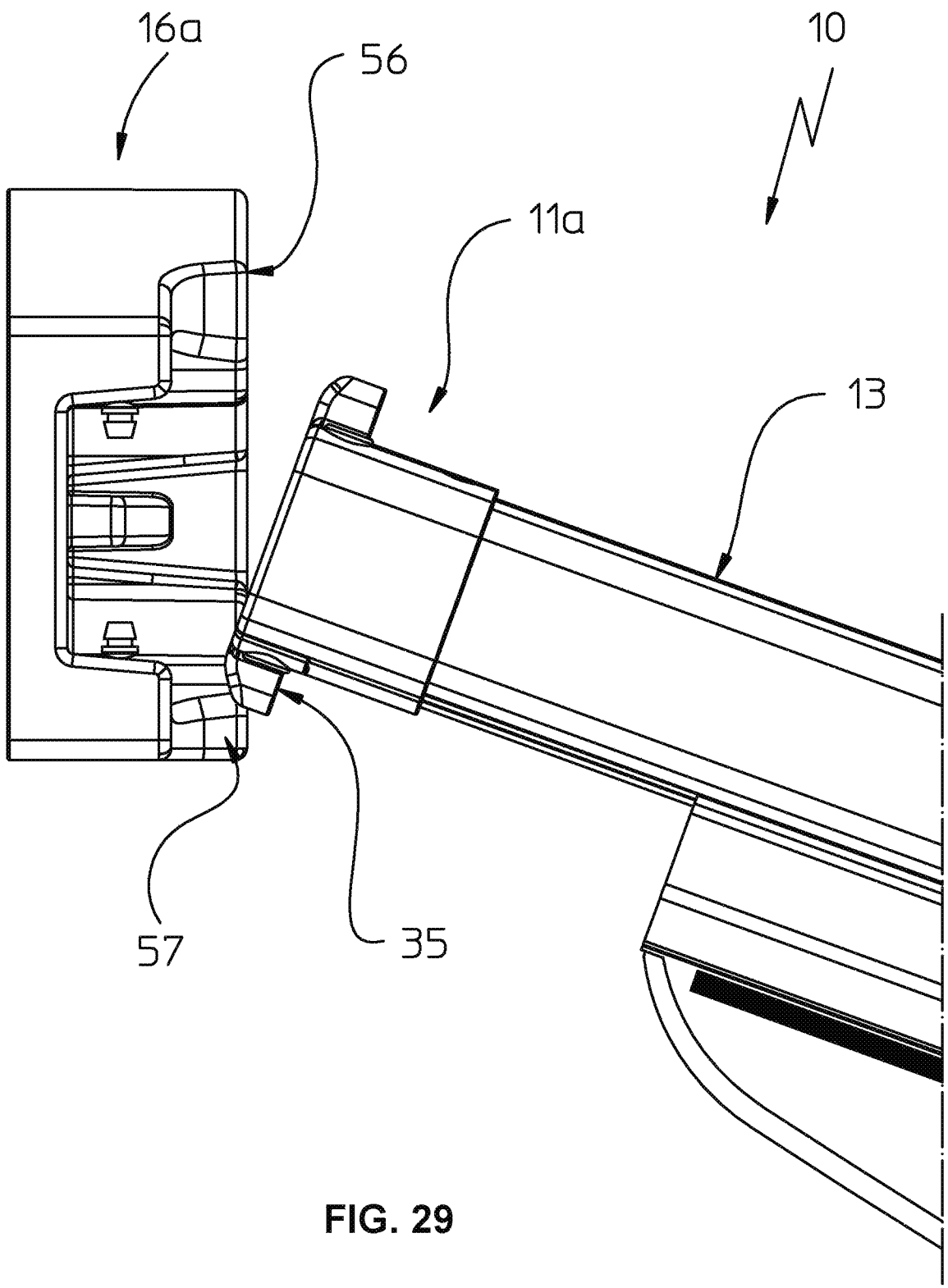
FIG. 29 illustrates the interlocking process of the first support in the first embodiment according to FIG. 6 and the first end cap in the first embodiment according to FIG. 1.
Figure 30:
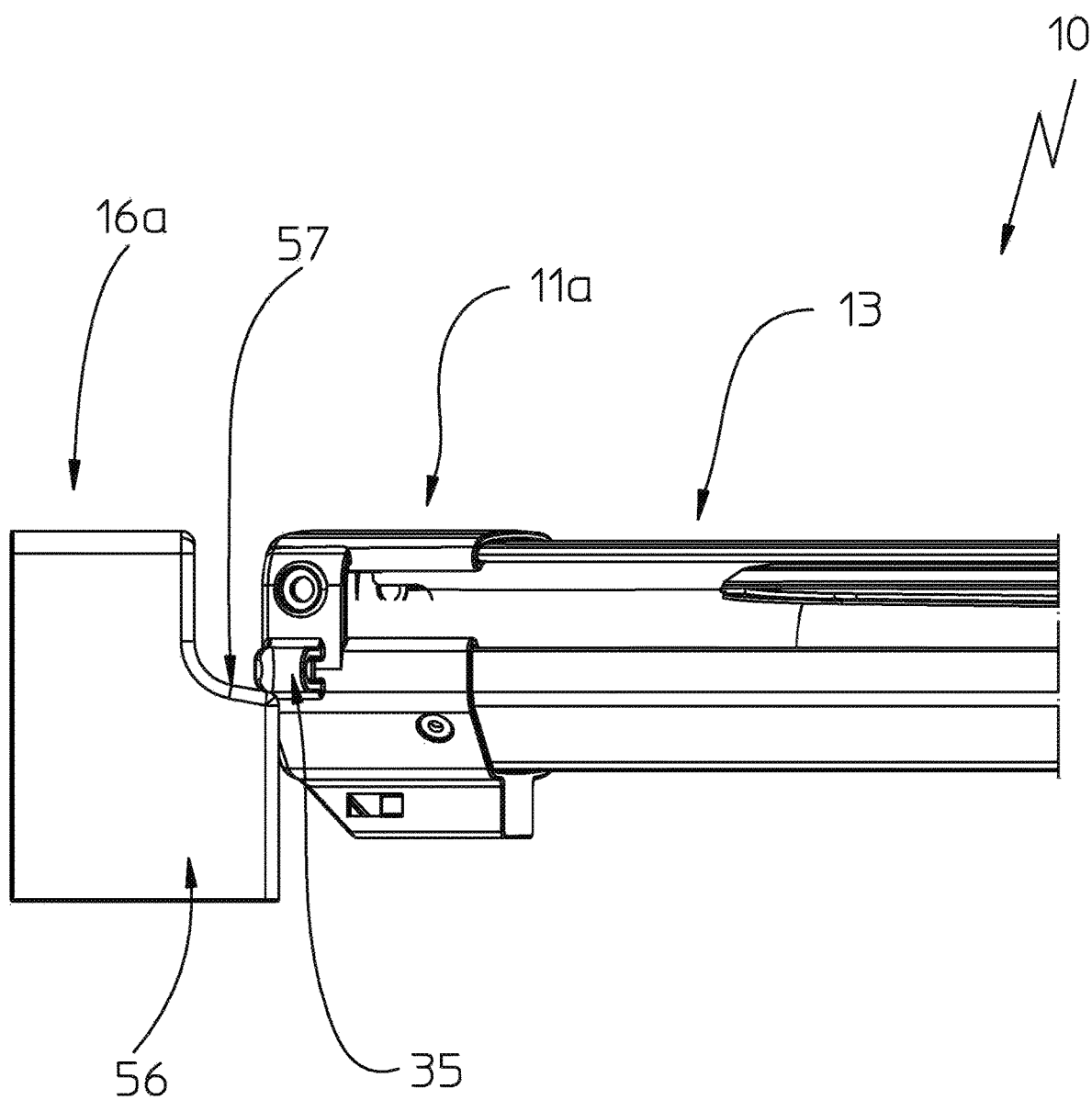
FIG. 30 illustrates the interlocking process according to FIG. 29 along a longitudinal axis of the vehicle.

The functional pairing of first support 11a, 11b and first end cap 16a, 16b is used for non-unlockable fixing of the cargo space cover, this functional pairing lacks a locking element that is movable between a locked position and an unlocked position. The fixing can only be accomplished by a retrieval movement in the transversal direction of the vehicle, in particular in a direction of the second support 12 where the fixing elements of the first support 11a, b and the first end cap 16a, b are separated from each other. a retrieval movement of this type however has the effect that the unlockable fixing that is established by a locking element that is move able between a lock able position and an unlocked position in a particular embodiment configured as a pivotable locking bar 96 is disengaged and a retrieval of the second end cap 17 from the second support 12 has been performed. This is important in that the non-unlock able fixing between the first support 11a, 11b and the first end cap 16a, 16b and the unlockable anchoring between the second end cap 17 and the second support 12 determine a structured assembly and disassembly process of the cargo space cover which is subsequently described based on FIGS. 29 and 30.

For mounting the cargo space cover 10 initially the first end cap 11a, 11b is fed to the first support 16a, 16b. This is performed essentially by moving the cargo space cover 10 in a mounting plane that is approximately parallel to the base group. Thus the cargo space cover 10 is moved into an interior of the motor vehicle with the first end cap 16a, 16b forward. In initially cooperating support structures of the first end cap 16a, 16b and the first support 11a, 11b impact each other before the anchoring elements cooperate. With respect to the first embodiment according to the invention this means that the shoulders 35 of the first end cap 16a (c.f. in particular FIG. 5) are used as a support structure and are placed onto the support plateau 57 of the support protrusion before the actual fixing process. Thus it suffices when only a shoulder 35 cooperates with a support plateau 57 due to the slanted arrangement of the cargo space cover in the mounting plane that is approximately parallel to the base group.

The cooperation of the support plateau 57 and the shoulder 35 leads to a stable prefixed position of the first end cap 16a at the first support 11a. Now the second end cap 17 is fed to the second support 12 wherein this is provided by a pivot movement within the mounting plane that is oriented essentially parallel to the base group. Thus, the stable prefixing between the first end cap 16a and the first support 11a forms the pivot axis. When reaching the second support 12 the second end cap 17 is slightly lifted out of the mounting plane and lifted above the second support 12 until the second end cap 17 is aligned on top with the upward oriented opening of the receiving space 100. At the latest with the subsequent vertically downward oriented insertion moving the second end cap 17 into the second support 12, the shoulders 35 that still serve as a support structure slide over the support plateaus 57 of the support protrusion 56 into the recesses 52 of the first support 11a and fix therein. The fixing of the cargo space cover 10 is complete when the locking element thus in particular the locking bar 96 performs its over stroke movement that is induced by the locking lug 105 in the unlocking direction and the locking element is brought back by the locking spring 95 into its locking position within the locking space 104. Thus the shoulders 35 in the first embodiment of the end cap 11a function as a support structure and as a fixing element.

Since the mounting process is presumed identical the first support 11a and the first end cap 16b of the second embodiment cooperate in a different manner that is not illustrated in the drawing figure. Thus the support pinion 44 (c.f. FIG. 12) contacts the support surface 61 so that a stable prefixing of the first support 11b and the first end cap 16b is provided. Also here the fixing of the second end cap 17 and the second support 12 is provided wherein the first end cap 16b penetrates the receiving space of the first support 11 during this process. The receiving space of the first support 11 can be configured open in upward direction which differs from FIGS. 14-18, Thus the interlocking lugs 58 of the first support 11b engage the support grooves 45 of the first end cap 16b so that an interlocking functional pairing is provided.

In both embodiments according to the invention the respective centering plunger of the first end cap 16a, b contacts the centering contour 53 of the first support 11a,b on the side of the first support 11a, b and the first end cap 16a, b. In the same way the centering contour 103 impacts the centering plunger 93 when establishing the functional pairing between the second end cap 17 and the second support 12. The force components applied by the spring elements 94 and 42 in the transversal direction of the vehicle center the winding shaft housing essentially in the middle between the first support 11 and the second support 12. The vertical force components provide a fit without clearance in the interlocked condition on a side of the functional pairing of the first support 11 and the first end cap 16 and of the second support 12 and the second end cap 17. In the functional pairing of the second end cap 17 and the second support 12 the vertical force component additionally provides a lifting the second end cap 17 in the second support 12 in the retrieval direction in unlocked condition.

FIGS. 25-28 describe the configuration of the control housing 87 which facilitates a particularly intuitive handling of the cargo space cover 10. First of all the drawings indicate that the locking bar housing protrudes significantly relative to the top side of the winding shaft housing. Thus it is immediately evident for the viewer on which side the pivoting locking bar 96 for disengaging the cargo space cover 10 is arranged. The cover surface 88 that closes the locking bar housing in the upward direction has a curvature that essentially corresponds to the pivot radius of the pivotable locking bar 96 and thus has a circular cross section. The cover surface 88 is shortened by a handle recess. In the longitudinal direction of the vehicle the locking bar housing 87 has side walls 97, The side walls 97 drop in the transversal direction of the starting from the cover surface 88 in a direction of the face wall of the second end cap 17 approximately down to the surface level of the winding shaft housing. This way a clear cut is generated in the housing. In this housing clear cut the pivotable locking bar 96 is accessible to the user in its locking position and arranged clearly visible. For unlocking the pivotable locking bar is slid into the locking bar housing 87 under the cover surface 88 until it assumes its unlocked condition. The cover surface 88 that receives the radius of the pivot movement indicates the movement direction and the movement path by which the pivotable locking bar is move able into its locking condition, wherein the indication is provided by the curvature of the cover surface 88.

This smart configuration of the locking bar housing 87 facilitates a simple and intuitive actuation of the locking mechanism of the cargo space cover 10 according to the invention.

REFERENCE NUMERALS AND DESIGNATIONS 10 cargo space cover
11 first support
12 second support
13 winding shaft housing
14 cover web
15 exit slot
16 first end cap
17 second end cap
18 tension rod
19 contour
20 hook element
30 axial protrusion
31 face wall
32 base wall
33 centering device support
34 side wall
35 shoulders
36 clear cut
37 support space
38 support pin
39 interlocking window
40 opening
41 centering plunger
42 spring element
43 housing contraction
44 support pin
45 interlocking groove
50 receiving space
51 wall of receiving space 50
52 recess
53 centering contour
54 rear wall
55 frontal surface
56 support protrusion
57 support plateau 58 interlocking lug
59 support space
60 base surface of support space 59
61 support surface
80 side wall
81 axial protrusion
82 side wall
83 base wall
84 cover wall
85 clear cut
86 centering device support
87 locking bar housing
88 cover surface
89 support space
90 support pin
91 interlocking window
92 storage space
93 centering plunger
94 spring element
95 locking bar spring
96 pivotable locking bar
97 side wall of locking bar housing 87
100 receiving space
101 rear wall
102 wall
103 centering contour
104 locking space
105 locking lug
200 positioning device of 11*b*
201 slanted surface

What is claimed is:

1. A cargo space cover for a motor vehicle, the cargo space cover comprising:
a winding shaft housing with a winding shaft arranged rotatably therein and configured to receive a cover web movable between a functional position where the cover web is at least partially pulled off from the winding shaft and a storage position where the cover web is substantially wound onto the winding shaft;
a first support and a second support arranged opposite to one another and at least indirectly attached to the motor vehicle body;
a first end cap arranged at a first face of the winding shaft housing;
a second end cap arranged at a second face of the winding shaft housing,
wherein the first support includes a first receiving space for receiving the first end cap,
wherein the first receiving space includes a receiving opening that is oriented towards the second support,
wherein the first support includes a first support interlocking element and the first end cap includes a first end cap interlocking element that cooperate with each other and that are configured to provide a disengageable interlocking of the winding shaft housing,
wherein the second support includes an upward open receiving space for receiving the second end cap,
wherein the second support includes a second support interlocking element and the second end cap includes a second endcap interlocking element that cooperate with each other and that facilitate an upward retrieval movement after unlocking,
wherein the first support includes a first support guide structure and the first end cap include a first end cap guide structure that cooperate with each other and that engage before the first end cap penetrates the first receiving space of the first support,
wherein the first support guide structure includes two upward facing support plateaus that are arranged in front and outside of the receiving opening of the first receiving space in a direction towards the second support, and
wherein one of the two upward facing support plateaus is arranged with respect to a driving direction of the vehicle ahead of the receiving opening of the first receiving space and another of the two upward facing support plateaus is arranged with respect to the driving direction of the vehicle behind of the receiving opening of the first receiving space.

2. The cargo space cover according to claim 1,
wherein the first end cap guide structure is configured as at least one shoulder that protrudes radially with respect to the winding shaft housing and that is configured to contact the support plateau, and
wherein the at least one shoulder includes two shoulders that are diametrically opposed to each other and that protrude radially with respect to the winding shaft housing.

3. The cargo space cover according to claim 2,
wherein the receiving space includes at least one recess configured to receive the at least one shoulder of the first end cap or two recesses configured to receive a respective shoulder of the end cap.

4. The cargo space cover according to claim 2,
wherein at least one shoulder of the first end cap together with the at least one recess of the first support form the interlocking elements for a non-unlockable interlocking of the winding shaft housing that is only disengageable by a retrieval movement of the winding shaft housing in a direction towards the second support.

5. A cargo space cover for a motor vehicle, the cargo space cover comprising:
a winding shaft housing with a winding shaft arranged rotatably therein and configured to receive a cover web movable between a functional position where the cover web Is at least partially pulled off from the winding shaft and a storage position where the cover web is substantially wound onto the winding shaft;
a first support and a second support arranged opposite to one another and at least indirectly attached to the motor vehicle body;
a first end cap arranged at a first face of the winding shaft housing;
a second end cap arranged at a second face of the winding shaft housing,
wherein the first support includes a first receiving space for receiving the first end cap,
wherein the first receiving space includes a receiving opening that is oriented towards the second support,
wherein the first support includes a first support interlocking element and the first end cap includes a first end cap interlocking element that cooperate with each other and that are configured to provide a disengageable interlocking of the winding shaft housing,
wherein the second support includes an upward open receiving space for receiving the second end cap,
wherein the second support includes a second support interlocking element and the second end cap includes a second endcap interlocking element that cooperate with each other and that facilitate an upward retrieval movement after unlocking,
wherein the first support includes a first support guide structure and the first end cap include a first end cap guide structure that cooperate with each other and that engage before the first end cap penetrates the first receiving space of the first support, wherein the support structure of the first support is a support space that extends axially with respect to the winding shaft housing, and wherein the support structure of the first end cap is a support pin that protrudes axially with respect to the winding shaft housing.

6. The cargo space cover according to claim 1, wherein the first support forms interlocking lugs that protrude radially into the receiving space for the first end cap with respect to the inserted winding shaft housing.

7. The cargo space cover according to claim 6, wherein the first end cap forms radially inward oriented interlocking grooves that cooperate with the interlocking lugs of the first support.

8. The cargo space cover according to claim 1, wherein the winding shaft housing and the supports include centering devices that fix the winding shaft housing in a position that is centered between the supports.

9. The cargo space cover according to claim 8, wherein at least the centering device of the second support forms an ejector together with the associated centering device of the winding shaft housing, and wherein the ejector lifts the second end cap of the winding shaft housing upward when the interlocking is disengaged.

10. The cargo space cover according to claim 8, wherein the first centering devices are configured as centering plungers that are spring loaded in a longitudinal axial direction of the winding shaft housing and second centering devices are configured as rigid centering contours, and wherein the centering plungers are advantageously arranged at the winding shaft housing side and the centering contours are configured at a support side.

11. The cargo space cover according to claim 1, wherein the first support forms a first centering contour and the associated first centering plunger on the winding shaft housing side forms a downward oriented first slanted centering surface that slopes downward in a direction towards the second support, and wherein the first slanted centering surface together with the first centering contour imparts an upward oriented force component upon the winding shaft housing.

12. The cargo space cover according to claim 10, wherein the second support forms a second centering contour which forms an upward oriented sliding surface that is sloped towards the first support, and wherein a cooperating winding shaft side second centering plunger forms a second slanted centering surface that is oriented approximately parallel to the sliding surface and that cooperates with the sliding surface.

13. The cargo space cover according to claim 8, wherein the second end cap includes a locking element configured as a pivotable locking bar that protrudes in a direction of the second support and that is movable between a locking position and an unlocking position and that is provided with support surfaces that precede the pivotable locking bar in the unlocking position.

14. The cargo space cover according to claim 1, wherein the second end cap forms a locking bar housing that protrudes radially upward relative to the winding shaft housing and that receives a pivotable locking bar that is arranged at the winding shaft housing.

15. The cargo space cover according to claim 14, wherein the locking bar housing includes a cover surface that is cambered essentially according to a pivot radius of the pivotable locking bar.

16. The cargo space cover according to claim 14, wherein a cover surface of the pivotable locking bar housing includes a clear cut that corresponds at least to a maximum pivot travel of the pivot bar in the opening direction.

17. The cargo space cover according to claim 16, wherein side walls of the locking bar housing slope from the cover surface to a face wall of the second end cap that is proximal the second support to a surface level of the winding shaft housing so that a housing clear cut is created that corresponds to the pivot travel of the pivotable locking bar.

18. The cargo space cover according to claim 1, wherein the cooperating first support interlocking element and the first end cap interlocking element form an interlocking that is not unlockable and only disengageable by a retrieval movement in a direction towards the second support.

* * * * *